United States Patent
Narula

(10) Patent No.: US 11,093,985 B2
(45) Date of Patent: Aug. 17, 2021

(54) SYSTEM, DEVICES, AND METHODS FOR ACQUIRING AND VERIFYING ONLINE INFORMATION

(71) Applicant: VALIDECK INTERNATIONAL, New Hamburg (CA)

(72) Inventor: Alok Narula, Kitchener (CA)

(73) Assignee: VALIDECK INTERNATIONAL, New Hamburg (CA)

( * ) Notice: Subject to any disclaimer, the term of this patent is extended or adjusted under 35 U.S.C. 154(b) by 60 days.

(21) Appl. No.: 16/141,213

(22) Filed: Sep. 25, 2018

(65) Prior Publication Data

US 2020/0098018 A1    Mar. 26, 2020

(51) Int. Cl.
    G06Q 30/02    (2012.01)
    G06Q 20/36    (2012.01)
    H04L 29/06    (2006.01)
    G06F 16/28    (2019.01)

(52) U.S. Cl.
    CPC ....... G06Q 30/0282 (2013.01); G06F 16/285 (2019.01); G06Q 20/363 (2013.01); H04L 63/083 (2013.01)

(58) Field of Classification Search
    CPC ...... G06Q 30/06; G06Q 20/341; G06Q 50/01; G06Q 20/352; G06Q 30/0282; G06Q 30/02; G06F 16/9535
    See application file for complete search history.

(56) References Cited

U.S. PATENT DOCUMENTS

| | | |
|---|---|---|
| 5,859,419 A | 1/1999 | Wynn |
| 6,963,848 B1 | 11/2005 | Brinkerhoff |
| 6,963,850 B1 | 11/2005 | Bezos et al. |
| 7,359,894 B1 | 4/2008 | Liebman et al. |

(Continued)

FOREIGN PATENT DOCUMENTS

| | | | |
|---|---|---|---|
| FR | 2805422 A1 | 8/2001 | |
| WO | 2015135600 A1 | 9/2015 | |
| WO | WO-2017115085 A1 * | 7/2017 | ......... G06Q 30/0201 |

OTHER PUBLICATIONS

Chiou et al. Building a Distributed, GPU-based Machine Learning Library. Electrical Engineering and Computer Sciences University of California at Berkeley Technical Report No. UCB/EECS-2016-113. May 17, 2016. (Year: 2016).*

(Continued)

*Primary Examiner* — Virpi H Kanervo
(74) *Attorney, Agent, or Firm* — Norton Rose Fulbright Canada

(57) ABSTRACT

A system and method of acquiring and verifying information is provided. The system comprises a processor, and a memory comprising a sequence of instructions which when executed by the processor configure the processor to perform the method. The method comprises acquiring data from a data source associated with an author of the data, normalizing the acquired data, determining, by the processor, an identity of the author of the data, classifying the normalized data based on the identity and acquired metadata, and storing in a memory the normalized data. Normalizing the acquired data comprises parsing the acquired data for meaningful information, extracting metadata from the acquired data, and mapping the parsed information to internal data structures.

24 Claims, 29 Drawing Sheets

(56) References Cited

U.S. PATENT DOCUMENTS

| | | | |
|---|---|---|---|
| 7,428,503 B1 | 9/2008 | Groff | |
| 7,478,054 B1 | 1/2009 | Adams et al. | |
| 8,671,055 B2 | 3/2014 | Spodak et al. | |
| 8,935,192 B1 | 1/2015 | Ventilla et al. | |
| 9,569,729 B1 | 2/2017 | Oehrle | |
| 9,792,643 B1* | 10/2017 | Masterman | G06Q 10/083 |
| 2002/0100808 A1 | 8/2002 | Norwood | |
| 2003/0120670 A1* | 6/2003 | Nareddy | G06Q 30/02 |
| 2005/0263596 A1 | 12/2005 | Nelson et al. | |
| 2006/0143068 A1 | 6/2006 | Calabria | |
| 2008/0126260 A1 | 5/2008 | Cox et al. | |
| 2011/0040604 A1* | 2/2011 | Kaib | G06Q 30/02 |
| | | | 705/7.37 |
| 2011/0231296 A1 | 9/2011 | Gross | |
| 2012/0023024 A1 | 1/2012 | Evans | |
| 2012/0284194 A1 | 11/2012 | Liu et al. | |
| 2013/0066771 A1 | 3/2013 | Ciurea | |
| 2013/0246302 A1 | 9/2013 | Black | |
| 2014/0006277 A1* | 1/2014 | Rao | G06Q 20/3572 |
| | | | 705/41 |
| 2014/0172700 A1 | 6/2014 | Teuwen | |
| 2014/0230053 A1 | 8/2014 | Mote | |
| 2014/0339315 A1* | 11/2014 | Ko | G06Q 20/3227 |
| | | | 235/492 |
| 2015/0178279 A1 | 6/2015 | Chen | |
| 2016/0292241 A1* | 10/2016 | Patterson | G16H 10/60 |
| 2017/0061300 A1 | 3/2017 | Yahia | |
| 2017/0186055 A1 | 6/2017 | Silkey | |
| 2017/0222960 A1* | 8/2017 | Agarwal | G06N 20/00 |
| 2017/0270572 A1* | 9/2017 | Schydlowsky | G06Q 30/0282 |
| 2017/0308573 A1 | 10/2017 | Brisebois | |
| 2018/0150829 A1 | 5/2018 | Kadam | |
| 2019/0325061 A1* | 10/2019 | Poirel | G06F 16/288 |

OTHER PUBLICATIONS

Written Opinion and International Search Report dated Jan. 30, 2020 in PCT Application No. PCT/CA2019/051369.

* cited by examiner

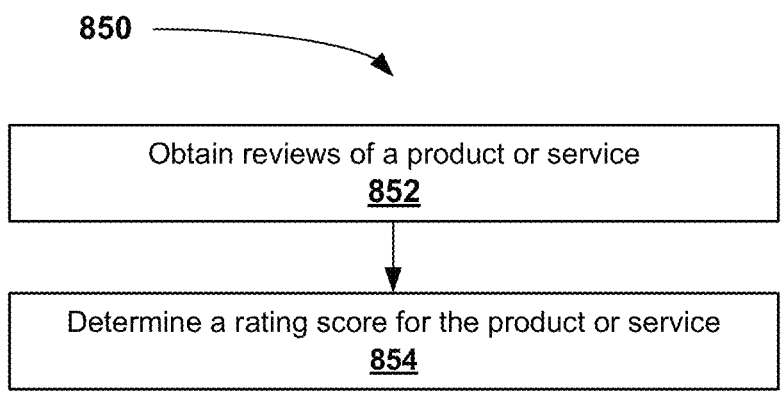
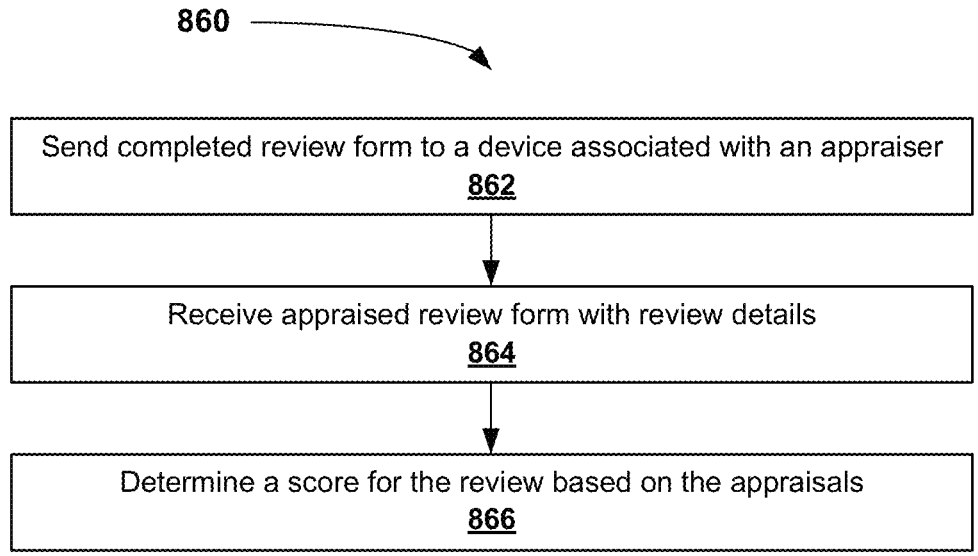
FIG. 8C
FIG. 8D (A): Checking the Purchase History on a Mobile Phone

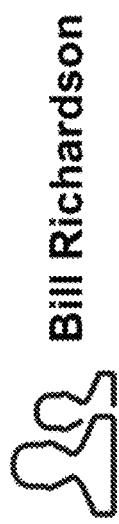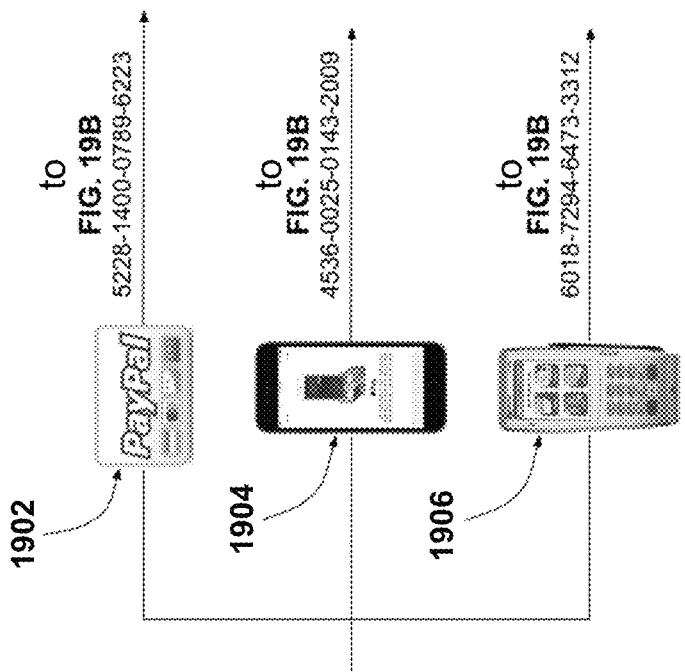
FIG. 19A

Database of Customer Reviews 2110

(A): Business as Usual

Amazon

| SN | Cust_Name | Cust_ID | Prod_Name | Prod_ID | Manufacturer | Mfg_ID | Store | Rating | Review |
|---|---|---|---|---|---|---|---|---|---|
| 1 | Bob | 1145967821 | Laptop Memory | 3179 | Corsair | 3876342189 | Amazon | 5 | blah, blah, blah |
| 2 | Philip | 1189713674 | HDD Case | 2014 | Tizum | 3245912736 | Amazon | 5 | blah, blah, blah |
| 3 | Bob | 1145967821 | Phone Flip Case | 6721 | Fideshox | 4562890351 | Amazon | 4 | blah, blah, blah |

Home Depot

| SN | Cust_Name | Cust_ID | Prod_Name | Prod_ID | Manufacturer | Mfg_ID | Store | Rating | Review |
|---|---|---|---|---|---|---|---|---|---|
| 1 | Alice | 1127659834 | Nail Clipper | 5240 | Victorinox | 2984516730 | Home Depot | 5 | blah, blah, blah |
| 2 | Alice | 1127659834 | Single Bedsheet | 1124 | Home Décor | 6381940274 | Home Depot | 4 | blah, blah, blah |

BestBuy

| SN | Cust_Name | Cust_ID | Prod_Name | Prod_ID | Manufacturer | Mfg_ID | Store | Rating | Review |
|---|---|---|---|---|---|---|---|---|---|
| 1 | Bob | 1145967821 | WiFi Extender | 3020 | Netgear | 3613400951 | Bestbuy | 1 | blah, blah, blah |
| 2 | Philip | 1189713674 | USB Cable | 1065 | Volts | 3926781454 | Bestbuy | 1 | blah, blah, blah |
| 3 | Philip | 1189713674 | MP3 Player | 8936 | Transcend | 4276983216 | Bestbuy | 1 | blah, blah, blah |

Crate & Barrel

| SN | Cust_Name | Cust_ID | Prod_Name | Prod_ID | Manufacturer | Mfg_ID | Store | Rating | Review |
|---|---|---|---|---|---|---|---|---|---|
| 1 | Alice | 1127659834 | Ice Cube Tray | 7281 | Prime | 7419322468 | Crate & Barrel | 1 | blah, blah, blah |
| 2 | Alice | 1127659834 | Rolling Pin Holder | 7546 | Sterling | 7024819032 | Crate & Barrel | 5 | blah, blah, blah |

WalMart

| SN | Cust_Name | Cust_ID | Prod_Name | Prod_ID | Manufacturer | Mfg_ID | Store | Rating | Review |
|---|---|---|---|---|---|---|---|---|---|
| 1 | Bob | 1145967821 | Hair Trimmer | 3127 | Panasonic | 2716384905 | WalMart | 3 | blah, blah, blah |

Office Depot

| SN | Cust_Name | Cust_ID | Prod_Name | Prod_ID | Manufacturer | Mfg_ID | Store | Rating | Review |
|---|---|---|---|---|---|---|---|---|---|
| 1 | Philip | 1189713674 | Whiteboard Marker | 9437 | Staedtler | 5274901267 | Office Depot | 5 | blah, blah, blah |

FIG. 21A

(B): SPOT - Consolidated Reviews per Person

Database of Customer Reviews 2120

| SN | Cust_Name | Cust_ID | Prod_ID | Prod_Name | Manufacturer | Mfg_ID | Store | Rating | Review |
|----|-----------|---------|---------|-----------|--------------|--------|-------|--------|--------|
| 1 | Bob | 1145967821 | 3020 | WiFi Extender | Netgear | 3612400951 | Bestbuy | 1 | blah, blah, blah |
| 2 | Bob | 1145967821 | 3179 | Laptop Memory | Corsair | 3876342189 | Amazon | 5 | blah, blah, blah |
| 3 | Bob | 1145967821 | 6721 | Phone Flip Case | Fidesbox | 4562890251 | Amazon | 4 | blah, blah, blah |
| 4 | Bob | 1145967821 | 5127 | Hair Trimmer | Panasonic | 2716384905 | WalMart | 3 | blah, blah, blah |

| SN | Cust_Name | Cust_ID | Prod_ID | Prod_Name | Manufacturer | Mfg_ID | Store | Rating | Review |
|----|-----------|---------|---------|-----------|--------------|--------|-------|--------|--------|
| 1 | Alice | 1127659834 | 5249 | Nail Clipper | Victorinox | 2984516730 | Home Depot | 5 | blah, blah, blah |
| 2 | Alice | 1127659834 | 7281 | Ice Cube Tray | Prime | 7419322468 | Crate & Barrel | 1 | blah, blah, blah |
| 3 | Alice | 1127659834 | 7546 | Rolling Pin Holder | Sterling | 7024819032 | Crate & Barrel | 5 | blah, blah, blah |
| 4 | Alice | 1127659834 | 1124 | Single Bedsheet | Home Decor | 6381940274 | Home Depot | 4 | blah, blah, blah |

| SN | Cust_Name | Cust_ID | Prod_ID | Prod_Name | Manufacturer | Mfg_ID | Store | Rating | Review |
|----|-----------|---------|---------|-----------|--------------|--------|-------|--------|--------|
| 1 | Philip | 1189713674 | 2014 | HDD Case | Tizum | 3245912736 | Amazon | 5 | blah, blah, blah |
| 2 | Philip | 1189713674 | 1065 | USB Cable | iVoltaa | 3926781454 | Bestbuy | 1 | blah, blah, blah |
| 3 | Philip | 1189713674 | 8936 | MP3 Player | Transcend | 4276983216 | Bestbuy | 1 | blah, blah, blah |
| 4 | Philip | 1189713674 | 9437 | Whiteboard Marker | Staedtler | 5274901267 | Office Depot | 5 | blah, blah, blah |

FIG. 21B

(C): Shared - Reviews Shared among a Group

Database of Customer Reviews 2130

| SN | Cust_Name | Cust_ID | Prod_Name | Prod_ID | Manufacturer | Mfg_ID | Store | Rating | Review |
|---|---|---|---|---|---|---|---|---|---|
| 1 | Bob | 1145967821 | WiFi Extender | 3020 | Netgear | 3612400951 | Bestbuy | 1 | blah, blah, blah |
| 2 | Bob | 1145967821 | Laptop Memory | 3179 | Corsair | 3876342189 | Amazon | 5 | blah, blah, blah |
| 3 | Philip | 1189713674 | HDD Case | 2014 | Tizum | 3245912736 | Amazon | 5 | blah, blah, blah |
| 4 | Bob | 1145967821 | Phone Flip Case | 6721 | Fintiebox | 4562890251 | Amazon | 4 | blah, blah, blah |
| 5 | Alice | 1127659834 | Nail Clipper | 5249 | Victorinox | 2984516730 | Home Depot | 5 | blah, blah, blah |
| 6 | Philip | 1189713674 | USB Cable | 1065 | Motta | 3926781454 | Bestbuy | 1 | blah, blah, blah |
| 7 | Philip | 1189713674 | MP3 Player | 8936 | Transcend | 4276983216 | Bestbuy | 1 | blah, blah, blah |
| 8 | Alice | 1127659834 | Ice Cube Tray | 7281 | Prime | 7419522468 | Crate & Barrel | 1 | blah, blah, blah |
| 9 | Alice | 1127659834 | Rolling Pin Holder | 7546 | Sterling | 7024819032 | Crate & Barrel | 5 | blah, blah, blah |
| 10 | Bob | 1145967821 | Hair Trimmer | 5127 | Panasonic | 2716384905 | WalMart | 3 | blah, blah, blah |
| 11 | Philip | 1189713674 | Whiteboard Marker | 9437 | Staedtler | 5274901267 | Office Depot | 5 | blah, blah, blah |
| 12 | Alice | 1127659834 | Single Bedsheet | 1124 | Home Décor | 6381940274 | Home Depot | 4 | blah, blah, blah |

FIG. 21C

Search Results of Products across Vendors and Over Time 2200B (B): RETAIL PRICES OVER TIME (MONTHS)

| # | | Product Name | Vendor | | | | | |
|---|---|---|---|---|---|---|---|---|
| 1 | | L'Oreal Paris Hair Expertise Extraordinary Oil Shine Serum - 100 ml | LONDON DRUGS | $5.99 | $6.99 | | $6.89 | $6.37 |
| | | | Walmart | $6.26 | $6.97 | $7.89 | $6.12 | $5.89 |
| | | | amazon.ca | $8.49 | $6.97 | $6.97 | $6.76 | $5.41 |
| 2 | | Kellogg's Muslix Almond Raisin Cereal - 450g | | $3.99 | $5.29 | $5.49 | $5.49 | $4.99 |
| | | | Walmart | $4.68 | $4.68 | $4.68 | $4.68 | $4.23 |
| | | | amazon.ca | $4.68 | $4.68 | $4.68 | $4.66 | $4.18 |
| | | | Loblaws | $5.29 | $5.49 | $5.99 | $5.49 | $5.09 |

FIG. 22B

SYSTEM, DEVICES, AND METHODS FOR ACQUIRING AND VERIFYING ONLINE INFORMATION

FIELD

The present disclosure generally relates to a system, device and method of acquiring and verifying online information.

INTRODUCTION

During the past two decades several software and hardware technologies have been patented and/or commercialized to assist people in searching for information and making retail purchases on the Internet. While these technologies have made it possible to do many tasks online, they have introduced some new challenges. There are a few dominant service providers for online search, social networking, and electronic commerce. Acquiring credible information on the Internet can often be a challenge due to the powerful influence of these service providers. Some people may take advantage of the tools and channels of communication provided by the service providers to influence the thoughts, motivations, and purchasing habits of people. Some of these service providers have been accused of not doing enough to curb the menace of fake news.

There exist systems for requesting and providing information from a member of a social network or an affinity group related to a requesting user. In other systems, a review engine may be connected to support modules and databases that receive, store and retrieve reviews based upon the subject and the user's relationship to the authors of the reviews. In other systems, users may selectively share information about their purchases with other users. In other systems, users may provide reviews of their online purchases so that other users may take these experiences into account when deciding what goods or services to purchase, or as part of an exchange of ideas and opinions. In other systems, a computer service allows Internet users to locate and evaluate products listed in an online portal, where a user receives personalized recommendations based upon the user's personal preference information.

In some systems, a universal card may be used to store the contents of several cards and can be used at any terminal equipped with a magnetic stripe reader or short range wireless communication capability. In other systems, a payment device may be in the same form factor as a typical credit or debit card, and can be programmed and reprogrammed with various payment profiles. In other systems, a universal financial data card may compile and store financial transaction records pertaining to a plurality of financial accounts. In other systems, a device may store information from multiple smart cards and data from multiple conventional magnetic stripe cards for use either through a magnetic strip emulator or as a 'virtual' contactless smart card.

SUMMARY

In accordance with an embodiment, there is provided a system for acquiring and verifying information. The system comprises a processor, and a memory comprising a sequence of instructions which when executed by the processor configure the processor to perform a method of acquiring and verifying information. The processor is configure to acquire data from a data source associated with an author of the data, normalize the acquired data, determine an identity of the author of the data, classify the normalized data based on the identity and acquired metadata, and store the normalized data. To normalize the acquired data, the processor is further configured to parse the acquired data for meaningful information, extract metadata from the acquired data, and map the parsed information to internal data structures.

In accordance with another embodiment, there is provided a computer-implemented method of acquiring and verifying information. The method is performed by a processor and comprises acquiring data from a data source associated with an author of the data, normalizing the acquired data, determining, by the processor, an identity of the author of the data, classifying the normalized data based on the identity and acquired metadata, and storing in a memory the normalized data. Normalizing the acquired data comprises parsing the acquired data for meaningful information, extracting metadata from the acquired data, and mapping the parsed information to internal data structures.

In accordance with another embodiment, there is provided a non-transitory computer-readable storage medium having instructions thereon which when executed by a processor perform a method of acquiring and verifying information. The method comprises acquiring data from a data source associated with an author of the data, normalizing the acquired data, determining an identity of the author of the data, classifying the normalized data based on the identity and acquired metadata, and storing the normalized data in a memory. The normalizing of the acquired data comprises parsing the acquired data for meaningful information, extracting metadata from the acquired data, and mapping the parsed information to internal data structures.

In various further aspects, the disclosure provides corresponding systems, devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein:

FIG. 8C illustrates, in a flowchart, an example of a method of rating a product or service, in accordance with some embodiments.

FIG. 8D illustrates, in a flowchart, an example of a method of rating a previously completed review, in accordance with some embodiments.

FIGS. 19, 19A and 19B illustrate an example of a billing record, in accordance with some embodiments.

FIGS. 21A, 21B and 21C illustrate an example of sharing consumer experiences, in accordance with some embodiments.

FIGS. 22A and 22B illustrate a search result of products across vendors and over time, in accordance with some embodiments.

It is understood that throughout the description and figures, like features are identified by like reference numerals.

DETAILED DESCRIPTION

Figure 1:
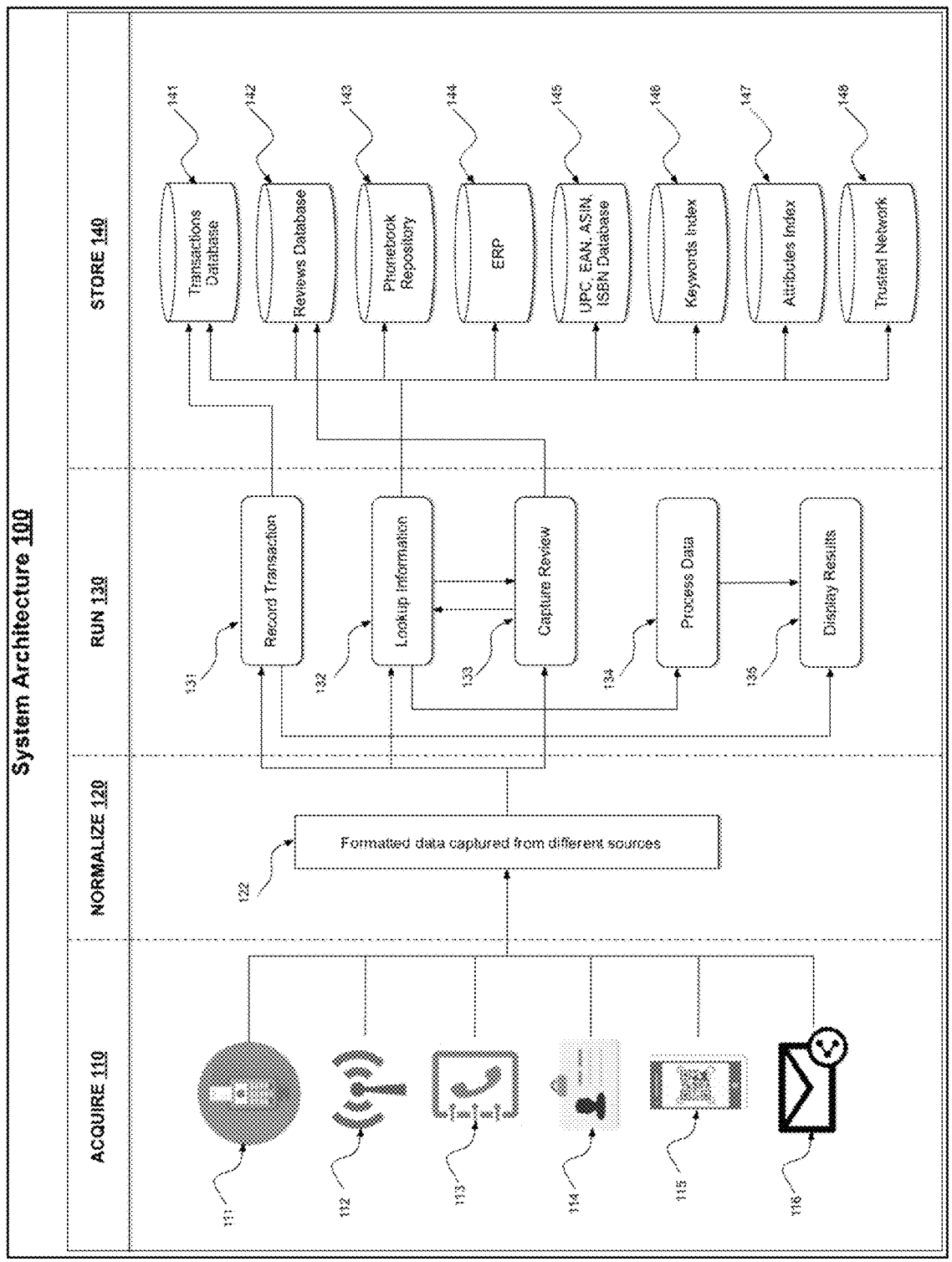
FIG. 1 illustrates an example of a top-level architecture of a system for acquiring and verifying online information, in accordance with some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The present disclosure provides a solution to ameliorate the problem of fake, unverifiable, and manipulated information circulating on the Internet. It also provides the means to search and locate credible information via a user's trusted network of friends, family, and acquaintances. The disclosure also provides a solution to the burden of carrying multiple plastic cards in a wallet/purse, and shows a manner in which the card transaction details can be used to capture reviews/experiences.

Many businesses and service providers collect reviews/feedback on their products or services at the time of purchase or when completing a transaction. The reviews may be collected on a paper form, but with increasing computerization, many reviews are collected electronically. If a review is collected in the presence of the business/service provider, it may be verifiable. However, when the reviews are submitted in the absence of the business/service provider, the reviews may sometimes not be credible.

Some electronic commerce sites try to capture customer feedback whenever a purchase is made. However, people may submit feedback for a product that they have not purchased from its website. Moreover, the feedback may include reviews posted by people whose credentials cannot be verified. Electronic commerce reviews may not contain information that can associate a bad/good review with a specific product feature/capability separately from the product.

Online search engines and electronic commerce sites often use a ranking system to provide information to its users. Sometimes, such ranking systems are unable to filter the noise from a search index. A search index stores web pages based on the relevance of their content and assigns these pages a score (e.g., a page rank) based on the quality of their back references or back links. Some ranking schemes operate by counting the number and quality of links to a page to determine a rough estimate of the value of the website to the searcher. Web pages with a higher rank are given precedence over pages with a lower rank, and this precedence is reflected in the order of search results. A search engine typically lists many search results every time a user performs a search, and the burden of establishing the truth in the search results is on the user. Typically, search engines make no claim regarding the credibility of a web page, and do not have a mechanism to enforce credibility.

Consider, for example, a scenario of a user who is residing in New York, USA. When this person looks for orthopaedic doctors in the city of New York, a search engine may provide a search result that includes several healthcare portals, each having a system of grading doctors. All of these portals may show reviews against the names of doctors registered with them, but do not verify the reviewer's credentials and do not follow any standard metric to capture patient feedback. This can be a problem both for the physician as well as the patient. When evaluating a doctor for consultation, a patient is unable to arrive at a doctor's rating that is applicable across the different portals because each portal uses different parameters for rating the doctor. For instance, portal "A" allows patients to rate a doctor on eight parameters (Ease of Appointment, Promptness, Courteous Staff, Accurate Diagnosis, Bedside Manner, Spends Time with Me, Follows Up After Visit, and Average Wait). By contrast, portal "B" allows patients to rate a doctor only on three parameters (Overall Rating, Bedside Manner, and Wait Time). This system creates a problem for the doctor too because a lower rating may be provided at a portal that uses more parameters (portal "A") versus a portal that uses fewer parameters (portal "B"). If the doctor uses both the portals for accepting appointments, the doctor may not be able to change the rating.

As such, using a search engine to find a doctor (or other services, products or information) may be fraught with problems. Since search engines typically make no claim on the credibility of its search results, if a doctor is selected based on the ratings shown on any of the healthcare portals, users run a risk of selecting a doctor with dubious skills. For instance, a look at one of the healthcare portals shows the following issues:

a) The reviews do not contain full patient names;
b) The reviews are not consistently listed in a reverse chronological manner;
c) Some doctor reviews have missing reviews for one full year, suggesting that the doctor was not practicing medicine for one whole year; and
d) The reviews do not contain a specific date (i.e., they are listed as "less than a year ago" or "more than a year ago").

Additionally, it is possible that inside staff or marketing professionals, posing as clients, wrote many of the reviews. Similar issues arise for searches of other products, services or information.

Finding credible information on the Internet can also be difficult when reviews are locked up in the silos of website owners. If a person submits reviews at five different portals, there may not be a framework to consolidate all the reviews posted by the person such that they are available to the person's social network.

Mobile devices offer users a handy alternative for capturing authenticated reviews and experiences with products, businesses, and service providers. A system architecture, platform and methods are described herein where a search result for the above scenario (for example) may be obtained that will list doctors based on the information captured about them through closed loop reviews. If these reviews are from a user's social network, the user will also be able to see the reviewer's personal data. But if the reviews are from an unrelated user, then the user will see an anonymous rank that has been credibly measured via a closed loop review, as will be further discussed below. It is understood that the proposed solution can be applied to other services, products and information canvassed on the Internet.

FIG. 1 illustrates an example of a top-level architecture of a system 100 for acquiring and verifying online information, in accordance with some embodiments. The system 100 architecture is organized in four sections: Acquisition 110, Normalization 120, Operations 130, and Storage 140. The system 100 is representative of a typical search engine that uses a mechanism to acquire data (e.g., a search string), perform validation checks on the data, initiate a lookup matching the data, and store the data necessary to fulfill a user request.

FIG. 1 shows that data can be acquired via various data sources 110, including a payment cube 111, a wireless device 112, direct input comprising a phone number 113, a business card 114, a quick response code 115, or an electronic mail (email)/uniform resource locator (URL) link 116. The scope of these data sources 110 is illustrative and not restricted to the devices/mechanisms described herein. Other data sources 110 may be used. For instance, a wireless data source can be any wireless device 112 such as a Bluetooth/ WiFi beacon deployed in a doctor's clinic/restaurant/retail store, a smart phone that transmits payment information to a card reader via near field communication (NFC) or any other device that uses radio signals for communication. It is understood that any electronic means of receiving, obtaining or entering information may be used to acquire the information. The data acquisition means may be communicatively coupled to a data acquisition unit or Application Programming Interface (API) of a data verification system or platform.

The data acquired through these sources may be normalized 122 before processing. Hardware and software vendors often use proprietary technologies for data storage and transmission. While the system 100 provides the means to acquire information directly into its data structures, sometimes it might need to process data that is significantly different from its own schema. In normalization 122, the data realized through different data sources 110 may be parsed for the required/desired information, and any metadata may be extracted to check for attributes pertaining to the data. Relevant information may be subsequently mapped to internal data structures, and finally saved in the data store (e.g., data storage) 140. An example of an internal data structure is a record having fields. It is understood that other data structures may be used to be able to retrieve and store data in a consistent manner.

Normalization may take place during machine-to-machine (M2M) communication. An example of this is when a transaction happens between a customer and a point-of-sale (POS) terminal. Once the customer makes a payment, a transaction record may be transmitted by the POS terminal to the system 100. The transaction record of some vendors may contain metadata such as stock keeping unit (SKU) codes or industry standard product identifiers, such as a universal product code (UPC)/international standard book number (ISBN) that may assist in classifying the transaction record before saving the information in the data stores 140. The system 100 may connect to the UPC/EAN/ASIN/ISBN database 145 to extract information on the UPC/ISBN code or interface with the vendor/service provider ERP 144 to extract attributes of a purchased item/service category. The extracted attributes may be associated with an identifier and stored with the normalized data in the data stores 140. In other embodiments, the transaction record may not contain any code or identifier, and the contents are deciphered by the system 100 using data extraction techniques and machine learning. Once the system 100 receives the transaction record, a daemon on the system may read the contents of the transaction (i.e., acquire data), parse the data and map the relevant information to internal data structures (i.e., normalize it) before saving the data in the data stores 140.

In some embodiments, review forms may be cached forms in order to reduce computation overhead. For example, a feedback form may not necessarily be generated each time a request is made to capture a review. During normalization, if the system 100 discovers that the content is already classified, and the data stores 140 have a cached copy of a feedback form, the system 100 may provide the cached copy of the feedback form to the user.

Once the data is acquired, it may be used to record a purchase transaction 131, perform a lookup 132 to retrieve the information requested by the user or to dynamically generate a context sensitive form to capture the user's review/experience 133. To initiate a lookup 132 or generate a context sensitive form 133, the search engine may refer to one or many of the data stores 140 comprising the transactions database 141, reviews database 142, phonebook repository 143, enterprise resource planning (ERP) system 144, universal product code (UPC)/European article number (EAN)/Amazon standard identification number (ASIN)/international standard book number (ISBN) database 145, keywords index 146, attributes index 147, and the trusted network 148. The retrieved data may be processed 134 and returned to the user as a search result 135. Other processes for the use of the data may be performed in other embodiments. It is understood that other databases or data repositories may be used in other embodiments.

Figure 2:
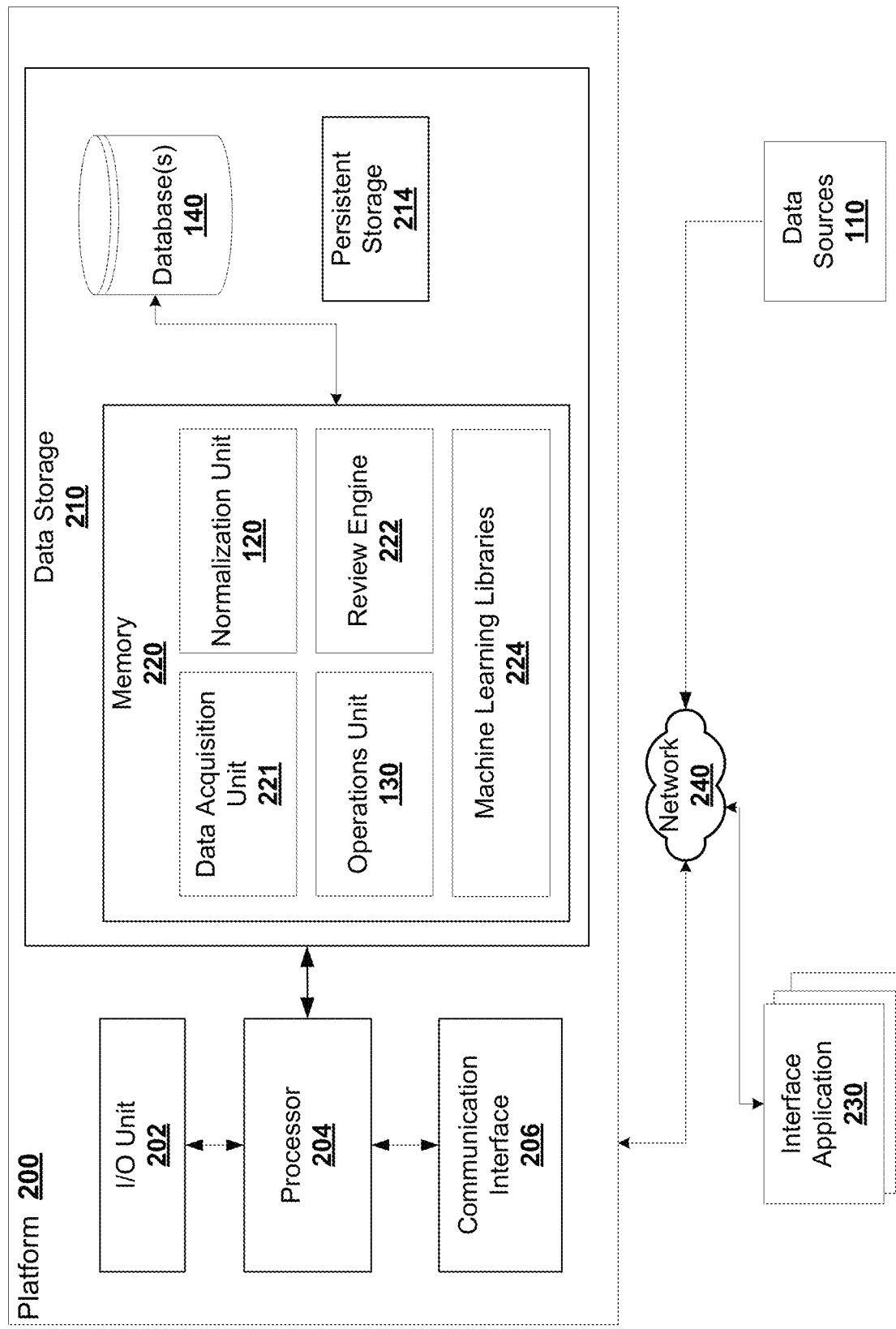
FIG. 2 illustrates, in a schematic diagram, an example of a platform for verifying information, in accordance with some embodiments.

FIG. 2 illustrates, in a schematic diagram, an example of a platform 200 for acquiring and verifying information, in accordance with some embodiments. The platform 200 may be an electronic device connected to an interface application 230 and data sources 110 via a network 240 (or multiple networks). The platform 200 can implement aspects of the processes described herein for acquiring and verifying information.

The platform 200 may include a processor 204 and a memory 220 storing machine executable instructions to configure the processor 204 to receive data (e.g., from data sources 110). The platform 200 may be implemented on an electronic device and can include an input/output (I/O) Unit 202, a communication interface 206, and data storage 210. The processor 204 can execute instructions in memory 220 to implement aspects of processes described herein. The platform 200 may receive and transmit data from one or more of these via the I/O unit 202. When the data is received, the I/O unit 202 transmits the data to the processor 204.

The I/O unit 202 can enable the platform 200 to interconnect with one or more input devices, such as a keyboard, mouse, camera, touch screen and microphone, and/or with one or more output devices such as a display screen and a speaker.

The processor 204 can be, for example, any type of general-purpose microprocessor or microcontroller, a digital signal processing (DSP) processor, an integrated circuit, a field programmable gate array (FPGA), a reconfigurable processor, or any combination thereof.

The data storage 210 can include memory 220, database(s) 140 and persistent storage 214. Memory 220 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 210 can include memory 220, databases 140, and persistent storage 214.

The communication interface 206 can enable the platform 200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX, LTE), SS7 signalling network, fixed line, local area network, wide area network, and others, including any combination of these.

The platform 200 can be operable to register and authenticate users (using a login, unique identifier, and password for example) prior to providing access to applications, a local network, network resources, other networks and network security devices. The platform 200 can connect to different machines or entities.

The data storage 210 may be configured to store information associated with, obtained by or created by the platform 200. Storage 210 and/or persistent storage 214 may be provided using various types of storage technologies, such as solid state drives, hard disk drives, flash memory, and may be stored in various formats, such as relational databases, non-relational databases, flat files, spreadsheets, extended markup (XML) files, etc.

The memory 220 may include a data acquisition unit 221 for acquiring data from data sources 110, a normalization unit 120 for normalizing the acquired data, an operations unit 130 for performing operations to the normalized data, a review engine 222 to generate forms used in acquiring information or review data, and one or more machine learning libraries 224. The units 221, 120, 130, 222, and 224 will be described in more detail below.

Figure 3:
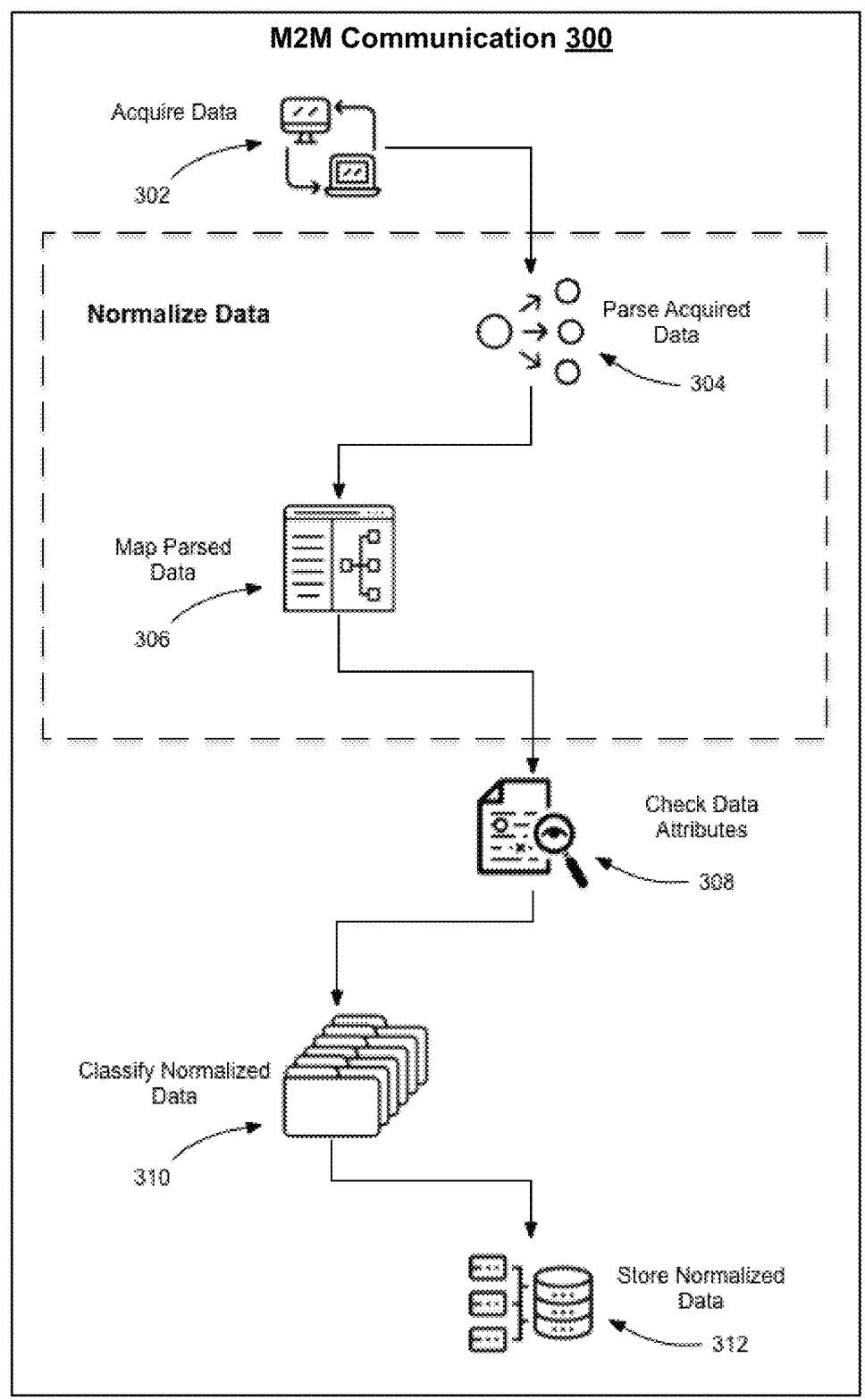
FIG. 3 illustrates an example of a method of acquiring and verifying information using machine-to-machine communication, in accordance with some embodiments.

FIG. 3 illustrates a method 300 of acquiring and verifying information using machine-to-machine (M2M) communication, in accordance with some embodiments. The method 300 comprises acquiring 302 data from a data source, parsing 304 the acquired data, mapping 306 the parsed data, determining 308 the identity of the data source (e.g., by checking attributes of the data), classifying 310 the normalized data based on the data source, and storing 312 the normalized data. The steps of parsing 304 and mapping 306 comprise normalizing the data. The step of determining 308 an identity of the data source may include determining the identity of a reviewer or person who provided the data. Such a determination will allow for a classification 310 of the acquired data based on the source. For example, if the data source is from a trusted source (such as a family member, acquaintance, recognized expert, recognized reputable source provider, etc.) then the acquired data can be associated with a value representing a high level of trust. If the data source is from an anonymous, non-trusted or dubious source, then the acquired data can be associated with a value representing a lower level of trust. Such classification of the data will be described in more detail below. Other steps may be added to the method 300 and the method 300 will be described in further detail below.

In some embodiments, the acquired data may include transaction data details, and/or review opinion details associated with a transaction, a product, an item, a service and/or a topic. The acquired data may have been solicited following a transaction, unsolicited following a transaction, or unsolicited sans (i.e., without) any transaction.

Figure 4:
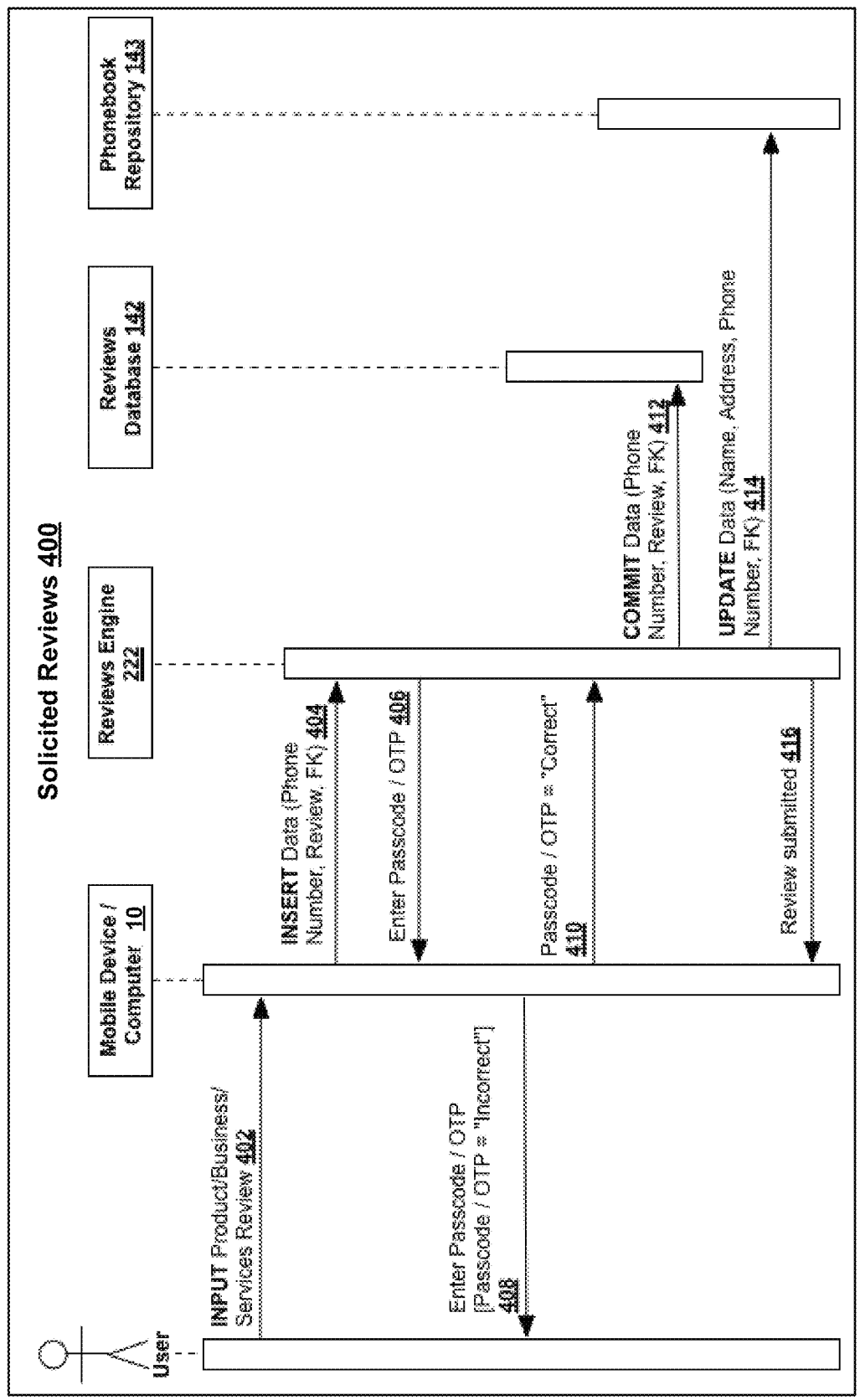
FIG. 4 illustrates, in a sequence diagram, an example of a method of acquiring review data solicited by a vendor/service provider, following a transaction, in accordance with some embodiments.

FIG. 4 illustrates, in a sequence diagram, an example of a method 400 of acquiring review data solicited by a vendor/service provider, following a transaction, in accordance with some embodiments. The method 400 pertains to an example of a solicited review requested by the merchant (via a co-branded form with custom parameters) following a transaction. The method 400 begins with a device 10 (such as a mobile phone) receiving an INPUT 402 from a user comprising a business/product/service review. Next, the device 10 sends an INSERT data message 404 to the review engine 222. The message 404 may include a phone number associated with the business being reviewed, review details and a foreign key (FK) as function call variables. Next, the review engine 222 may send an Enter passcode/one time password (OTP) message 406 to the device 10. The device may display a prompt 408 for the user to enter the passcode/OTP while the passcode is null or incorrect and allow the user to re-enter the passcode/OTP. When the device receives an input with the correct passcode, then the passcode is sent 410 to the review engine 222. The review engine 222 confirms the passcode is correct and sends a commit data message 412 to the reviews database 142. The commit data message 412 may include the phone number associated with the business being reviewed, the review details and the FK as function call variables. Subsequently, the review engine 222 may send an UPDATE data 414 message to the phonebook repository 143. Next, the review engine 222 may send a review submitted message 416 to the device 10 to confirm that the review has been received and submitted.

Figure 5:
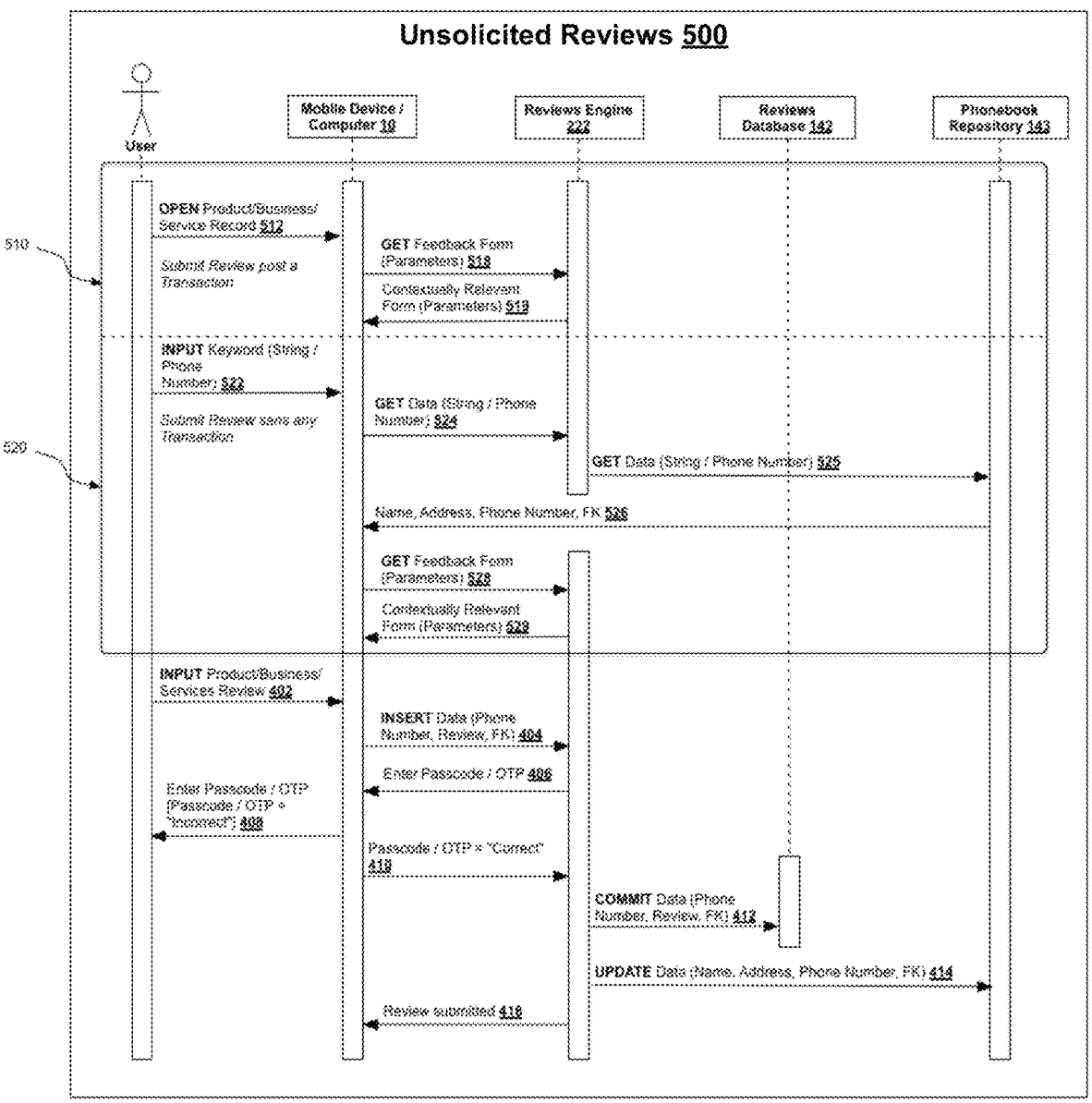
FIG. 5 illustrates, in a sequence diagram, an example of a method of capturing unsolicited reviews, in accordance with some embodiments.

FIG. 5 illustrates, in a sequence diagram, an example of a method 500 of capturing unsolicited reviews, in accordance with some embodiments. The method 500 includes two use cases: (a) an example of a user submitting an unsolicited review post a business transaction 510; and (b) an example of a user submitting an unsolicited review sans any business transaction 520, in accordance with some embodiments. It is understood that the method 500 may implement one of 510 or 520.

In the first case 510, the method begins with the device 10 receiving an OPEN record message 512 from a user. The message 512 may include a transaction record as a variable. The device 10 may then send a GET feedback form message 518 to the review engine 222. Next, the review engine 222 may return 519 a feedback form. The feedback form may be a contextually relevant feedback form and the message 519 may include the business name and/or phone number, and FK as variables.

In the second case 520, the method begins with the device 10 receiving an INPUT keyword command 522 from a user. The input may include a business name and/or a business phone number as variables. The device 10 may then send a GET data message 524 to the review engine 222. The message 524 may include a business name and/or phone number as a variable. The review engine 222 forwards this request 525 to the phonebook repository 143 that returns 526 the Name, Address, Phone Number, and Foreign Key (FK) of the business/service provider to the device 10. Next, the device may send a GET feedback form message 528 to the review engine 222. Next, the review engine 222 may return 529 a feedback form. The feedback form may be a contextually relevant feedback form and the message 529 may include the business name and/or phone number, and FK as variables.

Once the device 10 has the form 519, 529, the device may receive an INPUT 402 from the user corresponding to a business/product/service review. The device 10 may send the review to the review engine 222 via an INSERT data message 404 that may include the business phone number, the review details and the FK as variables. Next, the review engine 222 may send an Enter passcode/one time password (OTP) message 406 to the device 10. The device may display a prompt 408 for the user to enter the passcode/OTP while the passcode is null or incorrect and allow the user to re-enter the passcode/OTP. When the device receives an input with the correct passcode, then the passcode is sent 410 to the review engine 222. The review engine 222 confirms the passcode is correct and sends a commit data message 412 to the reviews database 142. The commit data message 412 may include the phone number associated with the business being reviewed, the review details and the FK as function call variables. Subsequently, the review engine 222 may send an update data 414 message to the phonebook repository 143. Next, the review engine 222 may send a review submitted message 416 to the device 10 to confirm that the review has been received and submitted.

Figure 6:
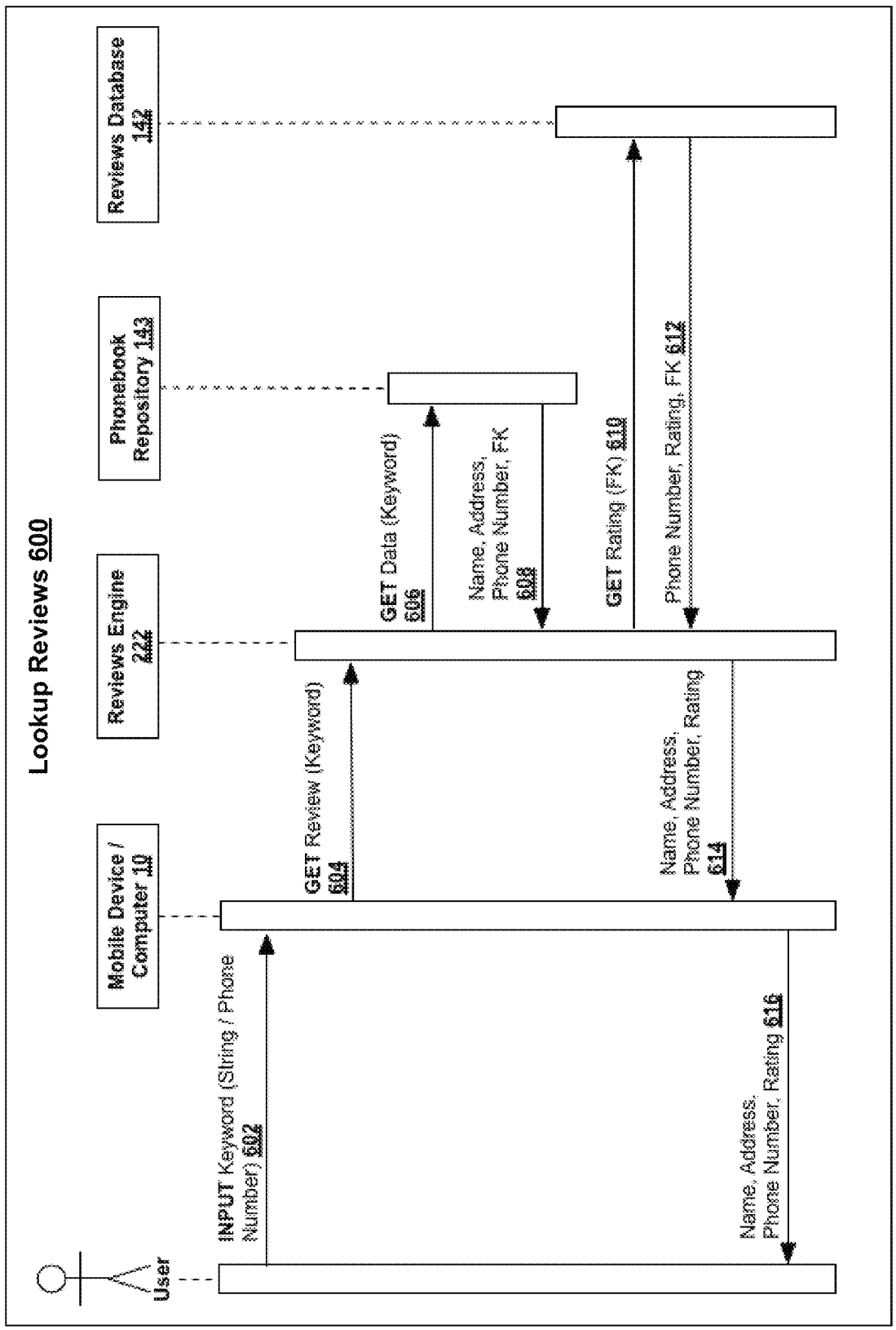
FIG. 6 illustrates, in a sequence diagram, an example of a lookup review method, in accordance with some embodiments.

FIG. 6 illustrates, in a sequence diagram, an example of a lookup review method 600, in accordance with some embodiments. The method 600 begins with the device 10 receiving an INPUT 602 from a user requesting a review for a business. The business name and/or phone number may be provided as a function call variable. Next, the device 10 may send a GET review message 604 to the review engine 222. The message 604 may include the business name and/or phone number as a function call variable. Next, the review engine 222 may send a GET data message 606 to the phonebook repository 143 to obtain an identifier for the business for which the review is being requested. Next, the phonebook repository 143 may send a return data message 608 to the review engine 222. The return data message 608 may include the business name, address, phone number and Foreign Key (FK). Next, the review engine 222 may send a GET rating message 610 to the reviews database 142. The GET rating message 610 may include the FK as a function call variable. Next, the reviews database 142 may send a return message 612 to the review engine 222. This message 612 includes the rating. Next, the review engine 222 sends a return review message 614 to the device 10, which then displays it 616 for the user. The review message 614 may comprise review data pertaining to the business, including the name, address, phone number and rating.

An example of the use of the system 100 and its methods will be described with reference to FIGS. 4, 5, and 6. FIGS. 4 and 5 comprise examples where the system 100 may acquire and verify information 300. A use case is demonstrated wherein a person has a smart phone that it can use to: a) Submit Solicited Review 400, b) Submit Unsolicited Review 500, and c) Lookup Reviews 600. The smartphone and a caller-ID app may be used to provide a solution to mitigate the problem of fake online reviews. An average smartphone has sensors (GPS, WiFi, Bluetooth) for capturing context from many different sources (location coordinates, beacons, POS devices). A caller-ID app running on a smartphone can use the contextual data captured from the smartphone sensors and pair it with the information from the phonebook repository, to create a short and dynamic feedback form that can capture genuine user reviews easily.

With respect to FIG. 4, an example of submitting a solicited review 400 of a business/service provider through a mobile device is provided. Consider a scenario where a user is vacationing at a Ski resort in Whistler, Canada with a spouse and two kids. The user had a wonderful stay at the resort, save the food that they found to be a little bit off the mark for their fastidious taste. When the user checks out of the resort, the user receives a short feedback form on the user's mobile phone, asking the user to share their experience. The Ski resort uses the system 100 to manage its customer reviews, whereby customized feedback forms have been designed for the resort and the system 100 captures all reviews on the behalf of the resort. The reviews are displayed on the resort's website and at any other portal where the resort wants to display its reviews.

In some embodiments, businesses may register with the system 100. When a new business is registered, the system 100 requests a Foreign Key (FK) for the business from the phonebook repository 143. If the repository 143 already has a business record, it provides the FK. If not, the repository 143 creates a new business record and provides the system 100 the FK of the record. The system 100 captures the business review against the FK and then reconciles the data with the repository 143.

The user captures their review on the feedback form and clicks the Submit button on the form that sends 302, the user's review to the system reviews API on the review engine 222. The reviews API caches the user's review temporarily and sends a passcode/OTP to the user to validate 308 the user's identity. When the user enters the correct passcode/OTP, the review is recorded 312 against the Resort's phone number and also against the user's phone number in the system reviews database 142. The App then reconciles the business address and phone number of the resort with the phonebook repository 143 API by firing a lookup in the API.

With respect to FIG. 5, an example of submitting an unsolicited 500 review of a business/service provider through a mobile device is provided. Consider a scenario where a user gave his motorcar for servicing to an automobile repair shop in Vancouver, BC. The user found the business through an Internet search engine and gave the motorcar for servicing even though the user did not find any business page of the firm containing its ratings/reviews. When the user receives the motorcar back from the automobile repair shop, the bill is $50 more than the estimate. The user speaks with the owner of the shop and after a brief discussion pays for getting the car serviced. After a few days of driving the car, the user finds that the noise in the gear system has returned. The user takes the car back to the shop and after a brief checkup is told that one of the parts in the gear system has worn out. To get the car fixed, the user needs to pay $250 to replace the part. The shop waives the labor charge since it has only been a few days since the car was serviced at the shop. The user pays the $250 and drives home. The user had a bad experience with the automobile repair shop and wants to write a review of the business for the benefit of friends and family members.

In some embodiments, the user opens the system 100 App 10 and types 522 the name or phone number of the shop. The user then clicks a Submit button that sends 524 a 'GET' query containing the Business Name and/or Phone Number to the review engine 222. The review engine 222 forwards this request 525 to the phonebook repository 143 that returns 526 the Name, Address, Phone Number, and Foreign Key of the business/service provider to the App 10. The App 10 uses this information to request 528 a feedback form from the system review engine 222. The review engine 222 dynamically generates a contextually appropriate feedback form and sends 529 it to the user. The user captures their review on the feedback form and clicks the Submit button on the form that sends 404 the review to the system 100 review engine 222. The review engine 222 caches the review temporarily and sends 406, 408 a Passcode/OTP to the user to validate their identity. When the user enters the correct Passcode/OTP 410, the review is recorded 412 against the shop's phone number in the system reviews database 142 and also against the user's phone number in the same database 142.

In some embodiments, the user's feedback is visible to their trusted network of friends and family along with the user's name but shown truncated/anonymized to the general public to prevent any backlash from the business/service provider. If anybody within the user's trusted network looks up the review of the restaurant in the mobile app, they will find the review linked with the phone number of the business and also linked to the user's phone number. This method of feedback collection is called a closed-loop review and may help select quality service providers easily instead of taking chances every time a service provider is selected. A review that is mapped to a telephone number may also be more difficult to fake since telephone operators may issue phone connections against valid identity proof (passport, social insurance number, voter ID) only.

The closed-loop review can be set up as a 2-way challenge or a 3-way challenge. In a 2-way challenge, the customer/user gives a feedback and the business/service provider verifies the review by confirming a money transaction against the client/user. In some embodiments, the customer can also provide a review of a product (e.g., book, electronic gadget) that it might have used elsewhere. In such cases, validating the client/user before recording its review may be vulnerable to misrepresentation. Some electronic commerce companies operate their online business with this model and, therefore, have to deal with the problem of misrepresentation. In a 3-way challenge, the customer gives feedback, and the feedback is routed to a 3rd party that has the capability to verify the feedback. Once the 3rd party verifies the review, the feedback is shared with the business/service provider who incorporates the review on their website. Some companies operate their business reviews with this model, through a partnership with a review company. The reviews of most businesses/service providers can be set up as a 2-way challenge. In some embodiments, such as services like medicine may be set up as a 3-way challenge to protect a doctor from biased reviews.

With respect to FIG. 6, an example of looking-up the reviews 600 of a business/service provider on a mobile device is provided. For example, a user opens a mobile App 10 and types 602 the name or phone number of the business/service provider. The user then clicks a Submit button that sends 604 a 'GET' query containing the Business Name and/or Phone Number to the review engine 222. The review engine 222 forwards 606 this request to the phonebook repository 143 that returns 608 the Foreign Key (FK), Name, Phone, Address, and Operating Hours of the business/service provider to the review engine 222. The review engine 222 then sends a 'GET' query 610 containing the FK to the system reviews database 142 and receives 612 the Business/Service Summary, Specialization, Rating, Comments, and FK. The review engine 222 may then perform a 'JOIN' on the data received from the phonebook repository 143 and the system reviews database 142 and generate the result comprising Name, Phone, Address, Operating Hrs, Business/Service Summary, Specialization, Rating, and Comments. The business/service providers review is shown on the mobile device as Name, Phone, Address, Operating Hrs, Business/Service Summary, Specialization, Rating, and Comments.

Figure 7:
FIG. 7 illustrates, in a spreadsheet table, an example of a result of a search request, in accordance with some embodiments.

FIG. 7 illustrates, in a spreadsheet table, an example of a search result 700 for an online review, in accordance with some embodiments. In this example, the search result 700 is for "Orthopaedic Doctors in New York". The search result 700 shows, in columns, the keyword 702 search query, doctor images 704, corresponding doctor names 706, overall rank (or overall score) 708 for each doctor, filter options 710 used to review the doctor, social rank 712 being the rank provided by the review, each reviewer name 714, the reviewer relationship 716 to the user requesting the search result 700, rating options 718 used to review the doctor, and values 720 on a 5 point scale with 1 being lowest and 5 being highest, for the ratings options 718. A user may then select a doctor based on the overall rank 708, social rank 712 of preferred reviewers, ratings values 720 for specific features 718, or a combination thereof.

The overall rank 708 may be a function of the social ranks 712. The social ranks are a function of the values 720 rated by each reviewer for the ratings options 718. In some embodiments, as shown, the review name may be partially or fully blocked unless the reviewer is within a predetermined relationship level with the person seeking the reviews. More, fewer or different items may be displayed in a search result. It is understood that the filter options 710 and rating options 718 shown are exemplary only and that other options may be used for other reviews. In some embodiments, an overall rank 708, social rank 712 and/or ratings values 720 associated with a review for a product or service may be adjusted based on repetitive purchasing of the product or working with the same business/service provider without the receipt of a formal review. The value attributed to such default review values may be set to a value relative to a range of value options available for the review of a product or service.

As described above, in the system 100, the review/experience by a person is not recorded in the search index and given adequate weightage until it is verified via a challenge/passcode, and also until the credibility of the submitter has been established. In some embodiments, the methodology used by the system 100 is orthogonal to a typical search engine ranking algorithm. While a search engine may rank a web page based on the quality of its back references, the proposed solution will rank a web page/URL—or any other source of online information—on the basis of the number of endorsements it has received from the common population and from subject matter experts. Endorsements from common people may be referred to herein as Voice of the People (VOP), and endorsements from subject matter experts may be referred to herein as Voice of the Expert (VOX). In some embodiments, an overall system page rank (VIC) may be derived from: a) the mathematical relationship between endorsements and rejections; and b) the mathematical relationship between the VOP and VOX rank.

In some embodiments, an overall score may comprise a combination of an average subject matter expert score and an average common person score. In some embodiments, a cumulative subject matter expert score used to determine the average subject matter expert score may be maintained in the reviews database 142. In some embodiments, a cumulative average person score used to determine the average person score may be maintained in the reviews database 142. In some embodiments, the review engine 222 may determine that the author is a subject matter expert, assign a subject matter expert score to the normalized data, and store the subject matter expert score with the normalized data. In some embodiments, the review engine 222 may determine that the author is a common person, assign a common person score to the normalized data, and store the common person score with the normalized data.

In some embodiments, the system 100 may grade users as VOP and VOX, based on their skills and abilities that have been diligently scrutinized and measured, and also on the basis of various other parameters, such as, for example:

1. How many critical parameters of the product were graded by the user?
2. What is the background of the person who has given the rating? How much biographical information has the person provided to us about itself? How much of the information has been found to be credible? For instance, if the person giving the rating is a qualified electronics engineer and he has published research papers, written patents, has been working as a product development engineer in a reputed consumer electronics firm, then a rating for a consumer electronic product by the person will have considerable value.
3. How many reviews has the person submitted? Higher the number of reviews and greater the diversity of reviews (across product categories) indicates that the reviewer is genuine.
4. How many of the reviews submitted by the person are endorsed? What is the relationship between this person and the people who have endorsed its reviews? An endorsement from a related person (friend, family, acquaintance) will have less value than endorsements from unrelated people.
5. How many of the reviews submitted by the person are rejected/negatively appraised? What is the relationship between this person and the people who have rejected/negatively appraised its reviews?

The above parameters are provided as an example. It is understood that more, fewer or other parameters may be used.

In some embodiments, a user may create an account with the platform 200. When a user creates an account on the platform 200, he/she may be given the status of a "VOP" user. A "VOP" user may be promoted to a "VOX" user when they provide evidence of their skills and knowledge. In some embodiments, the system 200 may provide VOP users the opportunity to collect badges via endorsements from other VOP or VOX users, take online exams that measure their skills and knowledge, and other such actions. In some embodiments, VOP users can collect badges for their skills within the platform 200 as well as from affiliates. For example, a computer programmer could collect badges via a service provider facility where software developers discuss programming issues. Once a VOP user has acquired enough badges, they may be transitioned to a VOX user. As noted above, a VOX user is a subject matter expert. In some embodiments, VOX users may be further graded on a sliding scale (e.g., level 1 through level 5).

In some embodiments, as reviewers can be classified and their reviews validated, so too can the providers of ratings or appraisals of the reviews. For example, a provider of a rating of a review may be a common person or a subject matter expert. The review engine 222 may receive an appraisal of a review from a third party, send to a customer device associated with the third party a validation message to confirm the identity of the third party, receive from the customer device associated with the third party a response message that confirms the identity of the third party, and associate based on the response message the electronic feedback form with review details with the appraisal. In some embodiments, a discarded review may lower an overall score of a review. In some embodiments, a number of discarded reviews may lower a reviewer score.

Distinguishing users into VOP and VOX (and in other embodiments into other categories of users) allows an internal overall system rank (VIC) to be derived from the mathematical relationship between endorsements/rejections received by VOP and VOX. In some embodiments, a grade by a VOX user may have a higher weight compared to a grade by a VOP user. Further, a grade by higher levels of a VOP (or VOX) user may be higher than a grade by lower levels of the VOP (or VOX) user.

In some embodiments, the system 100 uses contextually relevant feedback forms. A contextually relevant feedback form is semantically linked to the subject being reviewed. Consider a scenario where an electronic commerce site solicits a review of any product purchased via its portal. The site may provide a blank feedback form that does not include fields/parameters that a user can select. The electronic commerce site may capture user reviews in free text, and therefore, the information captured may not be amenable to searching. By contrast, the system 100 forms may be contextually relevant as will be further described below.

Figure 8A:
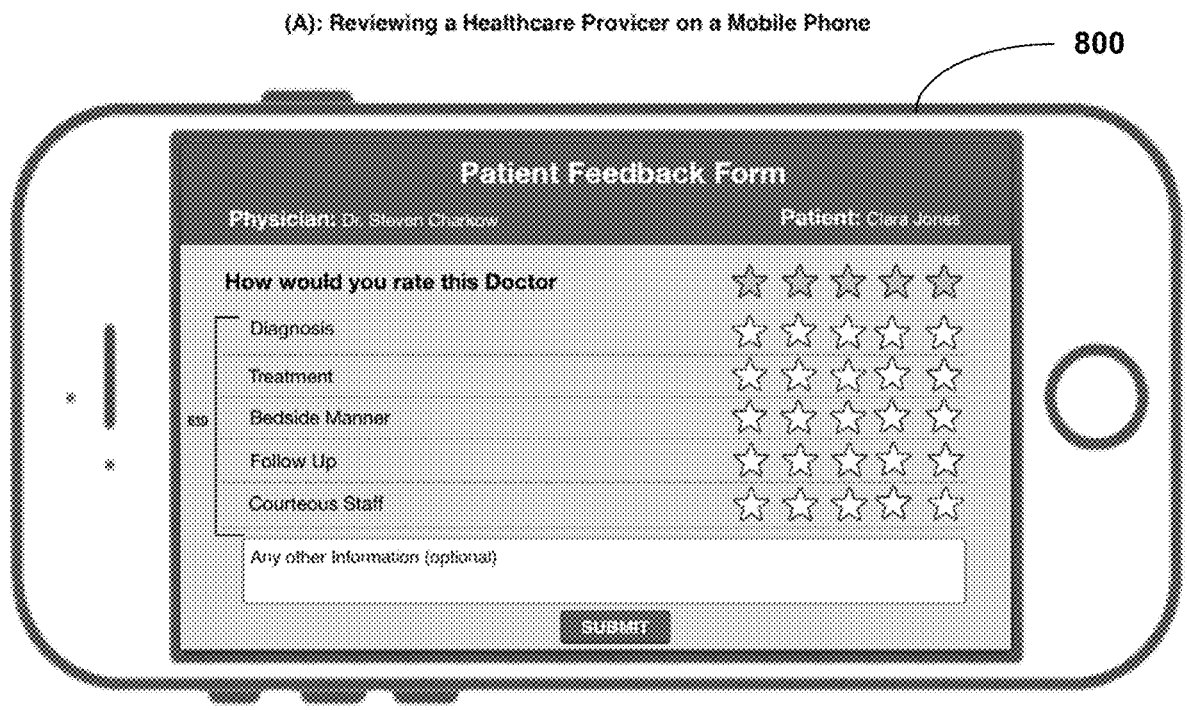
FIGS. 8A and 8B illustrate an example of a contextually relevant feedback form for rating a doctor, in accordance with some embodiments.
Figure 8B:
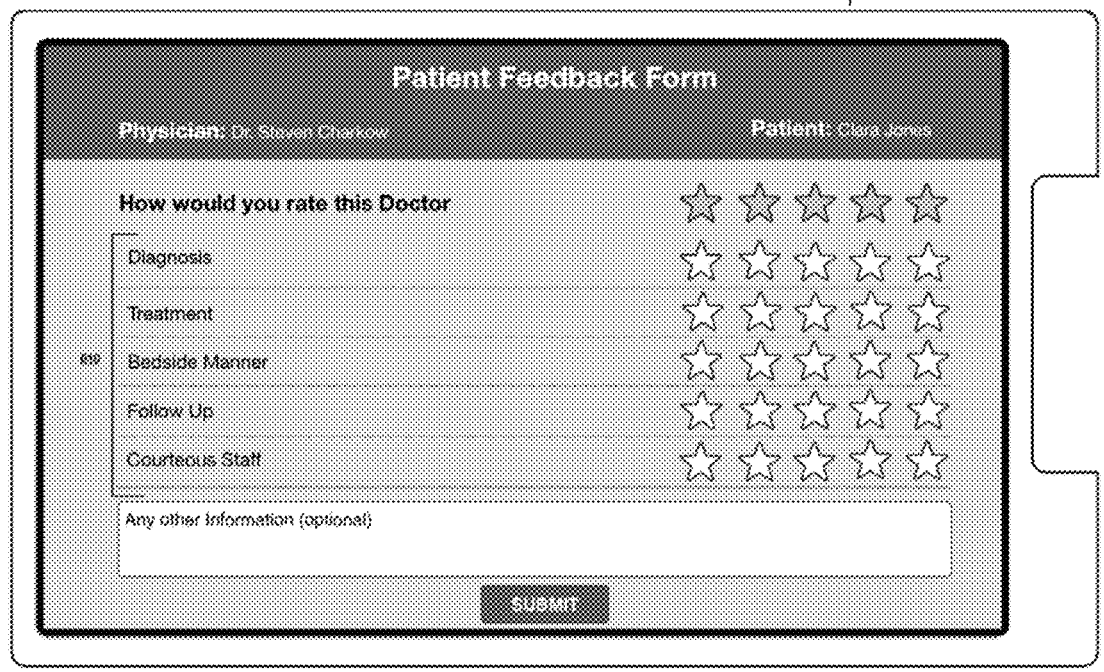

In some embodiments, the system 100 review forms may have a number (e.g., five) of parameters that will be automatically discovered when the user selects/clicks a Review button on a portal/user interface. In some embodiments, these parameters may comprise, or otherwise be associated with, rating options 718. FIGS. 8A and 8B illustrate an example of a contextually relevant feedback form for rating a doctor, in accordance with some embodiments. In this example, the feedback form has five parameters 810 in which a doctor's ability is measured: Diagnosis, Treatment, Bedside Manner, Follow Up, and Courteous.

A similar form to capture the feedback for a restaurant may have different parameters, such as:

1. How was the food?
2. Was it served on time?
3. How was the ambiance?
4. Did you get value for money?
5. Did you get parking?

It is understood that fewer or other parameters may be used for different reviews of the same or different types of businesses, products, services or items.

The illustrations in FIGS. 8A and 8B show an example of how a user may submit its review via a mobile phone 800 or via a smart card sleeve 1100 (the sleeve 1100 will be described in more detail below). The feedback form of the example shown in FIGS. 8A and 8B may be generated by the review engine 222 when the user chose to review a healthcare provider.

FIG. 8C illustrates, in a flowchart, an example of a method 850 of rating a product or service, in accordance with some embodiments. The method 850 comprises obtaining 852 reviews of the product or service, and determining 854 a rating score for the product or service. The rating score may be determined based on at least one of a list of parameters that have been evaluated in the reviews, a number of positive rated parameters from common people, a number of negative rated parameters from common people, a number of positive rated parameters from subject matter experts, and/or a number of negative rated parameters from subject matter experts. The parameters may be logically associated with a type of product or service. The score may be determined based on at least one of a number of the parameters in the review that have been graded, a background of a reviewer of a review form, a number of reviews submitted by the reviewer, a number of reviews submitted by the reviewer that have been endorsed, a number of reviews submitted by the reviewer that have been rejected, a number of false reviews previously submitted by the reviewer, and/or if the product or service has received a negative rating, determining if a negative rating is reflected across different categories of the product or service provided by the supplier.

FIG. 8D illustrates, in a flowchart, an example of a method 860 of rating a previously completed review, in accordance with some embodiments. The method 860 comprises sending 862 to a device associated with an appraiser a completed review comprising a plurality of selected review parameters, receiving 864 from the device associated with the appraiser the appraised review form with review details, and determining 866 a score for the review based on the appraisals.

In an aspect, the background of the reviewer may comprise one of a common person, a subject matter expert, and/or a fake reviewer. In an aspect, the background of the reviewer background is determined to be a fake reviewer, and the review is discarded. In an aspect, the background of the reviewer is determined to be a subject matter expert, and a rating of the review is raised by a first factor. In an aspect, the background of the reviewer is determined to be a common person, and a rating of the review is raised by a second factor.

Other steps may be added to the method 860, such as obtaining the type of product or service, selecting the parameters associated with the type of product or service, and/or auto-populating the review form with the parameters logically associated with the type of product or service. In an aspect, the method 860 further comprises providing an option for the reviewer to change a parameter in the review form.

A review can be positively appraised (e.g., via a "thumbs-up" selection) or negatively appraised (e.g., via a "thumbs-down" selection). When a review receives a "thumbs-up" or "thumbs-down" selection, the review engine 222 may determine the profile of the person who is giving the endorsement/rejection. The connection of the person with the original review may also be determined. If the endorsement is coming from an affiliate/family member, then the integrity of the affiliate/family member may also be determined.

Just as with reviews, some who appraise reviews may also try to game the system. The overall system rank (VIC) and also the VOP and VOX scores could be impacted in the scheme of things. If a person is determined to be playing mischief, their rankings in the system 100 could be adjusted so that their reviews do not have the same weight as an honest reviewer or appraiser.

Figure 9:
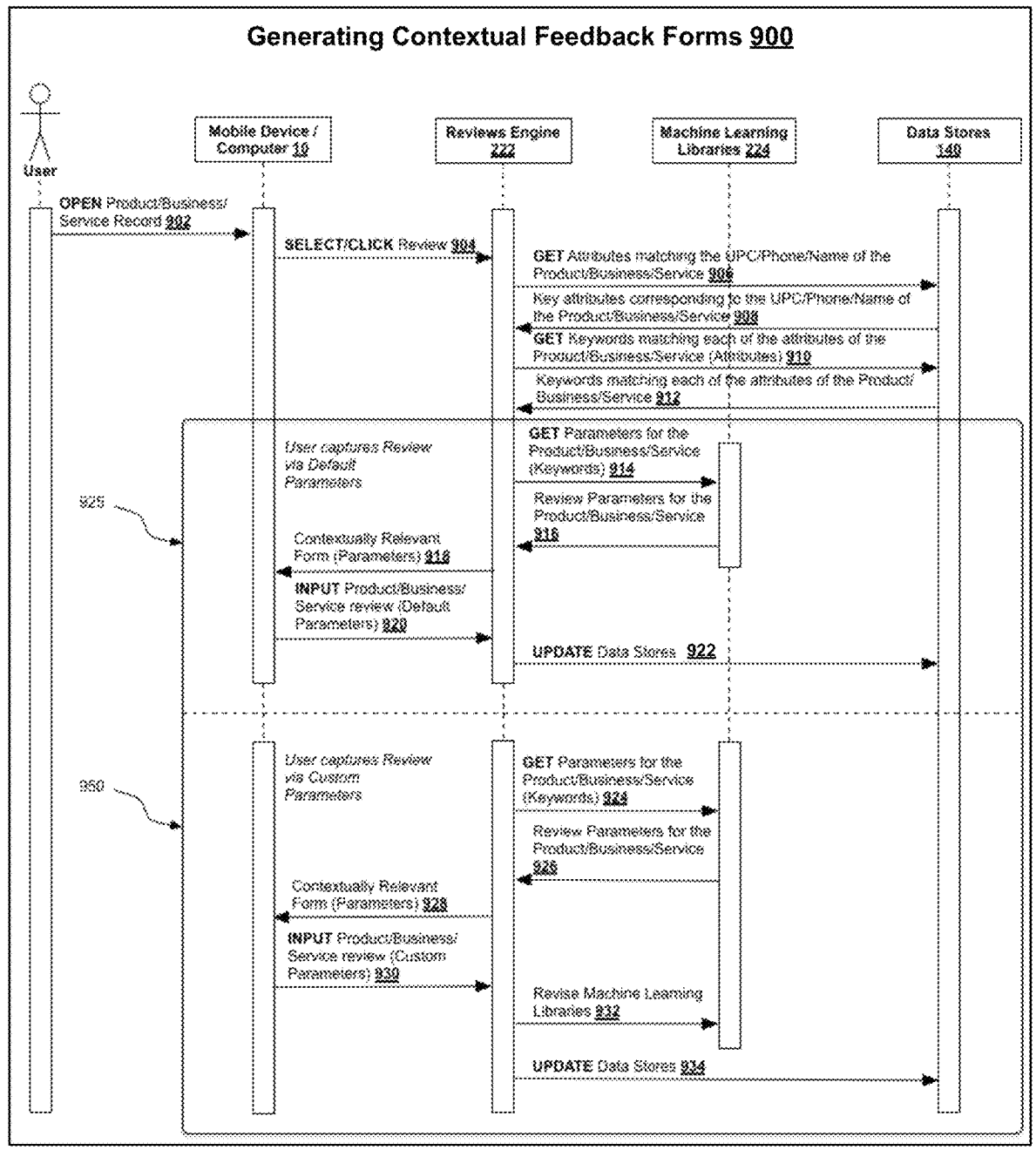
FIG. 9 illustrates, in a sequence diagram, an example of a method of generating a contextual feedback form, in accordance with some embodiments.

FIG. 9 illustrates, in a sequence diagram, an example of a method of generating a contextual feedback form 900, in accordance with some embodiments. The method 900 includes two use cases: (a) an example of a user submitting a review via default parameters 925; and (b) an example of a user submitting a review via custom parameters 950, in accordance with some embodiments. It is understood that the method 900 may implement one of 925 or 950.

The method 900 begins with the device 10 receiving an input 902 from a user. The input may include a transaction record or a business name and/or a business phone number as variables. The device 10 then sends a SELECT message 904 to the review engine 222. The SELECT message 904 may include a Foreign Key (FK) of the transaction record or business name and/or phone number. The review engine 222 then looks 906 for attributes matching the transaction invoice in its data stores 140. Next, the data store 140 returns attributes 908 matching the invoice, and then the review engine 222 sends a GET request 910 containing the attributes 908 as parameters to receive keywords matching the attributes. Next, the data store 140 returns keywords 912 matching the invoice. The review engine 222 then initiates a request 914, 924 with the machine learning libraries 224 to get parameters corresponding to the keywords. The machine learning libraries 224, which may repetitively be revised by the information it is discovering, pulled out 916, 926 the parameters corresponding to healthcare providers. The review engine 222 then generated 918, 928 a feedback form shown in FIGS. 8A and 8B and asked the user to submit its review. The user can choose to capture his review 920, 930 in the default five parameters (use case 925) or define its own parameters (use case 950).

In some embodiments, the review engine 222 is aware that some users are more knowledgeable about their domain; therefore it 222 may allow users to define their own parameters. If the user chooses to go ahead with the default parameters 920, the review engine 222 records 922 the review in the data store 140. If the user chooses custom parameters 930, the review engine 222 accepts the review and submits 932 the information to the machine learning libraries 224. The machine learning libraries 224 maintain a corpus of information that it 224 discovers via user interaction. When it 224 finds that users are choosing to define parameters that are semantically related to each other, it 224 revises its lookup table. Subsequently, the review engine 222 may send an update data message 934 to the phonebook repository 143 of the data stores 140.

As noted above, the machine learning libraries 224 may adjust the contextual feedback forms based on user interaction. In some embodiments, a default number of rating options 718 may be provided to the user on a contextual feedback form. Moreover, there may be only a subset of possible rating options provided in the default number. The machine learning libraries 224 may note that a number of VOP reviewers or VOX reviewers request changes to the default setting. The machine learning libraries 224 may then update the default setting to reflect selections being made. In some embodiments a number of VOP reviewers or VOX reviewers may need to request the same change before the default setting is made. In some embodiments, the number of VOX users observed before a change to the default settings is made may be lower than the number of VOP users. In some embodiments, each VOP or VOX reviewer may be assigned a weight value. When a change is requested to a feedback form, an accumulated weight value score of reviewer changes may be tracked. Once a threshold is passed, the machine learning libraries 224 may then modify the default feedback form rating options accordingly. It is understood that there may be more categories of reviewers having different weight values. It is understood that other machine learning techniques may be used to evaluate when a change to a default feedback form rating options is to be made.

With respect to FIG. 9, an example of generating a feedback form is provided. The health care use case example described above will now be extended with reference to FIG. 9. A user selected the Review button on a system portal/user interface when he visited his doctor for follow-up. The user had to make a part payment for their health condition because the insurance did not completely cover the treatment. After the user made the payment via a credit card, the user received a transaction invoice containing the doctor's name, business address, and phone number. The user did not record a review immediately; but after a couple of weeks when the user was sure that the doctor's treatment alleviated the medical condition.

When the user opened the transaction 902 and selected the Review button against the doctor's invoice 904, the review engine 222 looked 906 for attributes matching the transaction invoice in its data stores 140. The data store 140 returned 908 attributes matching the invoice, and then the review engine 222 looked 910 for keywords matching the attributes. The data store 140 returned 912 keywords matching the invoice. The review engine 222 then initiated 914, 924 a request with the machine learning libraries 224 to get parameters corresponding to the keywords. The machine learning libraries 224, which may repetitively be revised by the information it is discovering, pulled 916, 926 out the parameters corresponding to healthcare providers. The review engine 222 then generated 918, 928 a feedback form shown in FIG. 8A and asked the user to submit a review of the healthcare provider. The user can choose to capture their review in the default five parameters 925 or define their own parameters 950. The review engine 222 may allow users to define their own parameters. If the user chooses to go ahead with the default parameters 920, the review engine 222 records 924 the user's review in the data stores 140. If the user defines 930 parameters, the review engine 222 accepts the review and submits 932 the information to the machine learning libraries 224 before recording (e.g., via an UPDATE 934) the user's review in the data stores 140. The machine learning libraries 224 maintain a corpus of information that it 224 discovers via user interaction. When it 224 finds that a number of users are choosing to define parameters that are semantically related to each other, it 224 may revise its lookup table.

The review engine 222 and the machine learning libraries 224 work in concert to gather maximum relevant information via a review. Therefore, when a review engine 222 detects a prior review of the vendor/service provider by the submitter, it 222 may provide the submitter a choice of different parameters for capturing the review. This benefits the vendor/service provider as well because it can gather as much feedback as possible. The framework allows vendors/service providers to collaborate with the system 100 in improving the review engine 222 and the machine learning libraries 224.

Smart Wallet

A credit card may be used to capture details of a monetary transaction as well as initiate a purchase transaction. When a person makes a payment via a credit card, he/she may receive two print statements from the point-of-sale (POS) representative: a consolidated statement of amount debited to the person for the transaction, and a statement showing the items/service purchased. The statement of purchase need not be printed out and can be instead recorded into the credit card/smart card or into the cardholder's account on an online database, during the purchase transaction. An electronic copy of the purchase transaction can assist the card user with many things including capturing its experience vis-à-vis the different products and services he/she purchased and then share this information with a social network.

Smart cards may be programmed via a wireless interface, which is typically the person's mobile phone. However, an active wireless interface on a payment device may be vulnerable to reverse engineering and theft. Payment cards should be amenable to programming via a hand held device that reads and writes to the payment card via a physical connection.

The present disclosure also provides a solution to mitigate the burden of carrying multiple plastic cards in a wallet/purse, and describes a way in which the card transaction details can be used to capture reviews/experiences.

Figure 10:
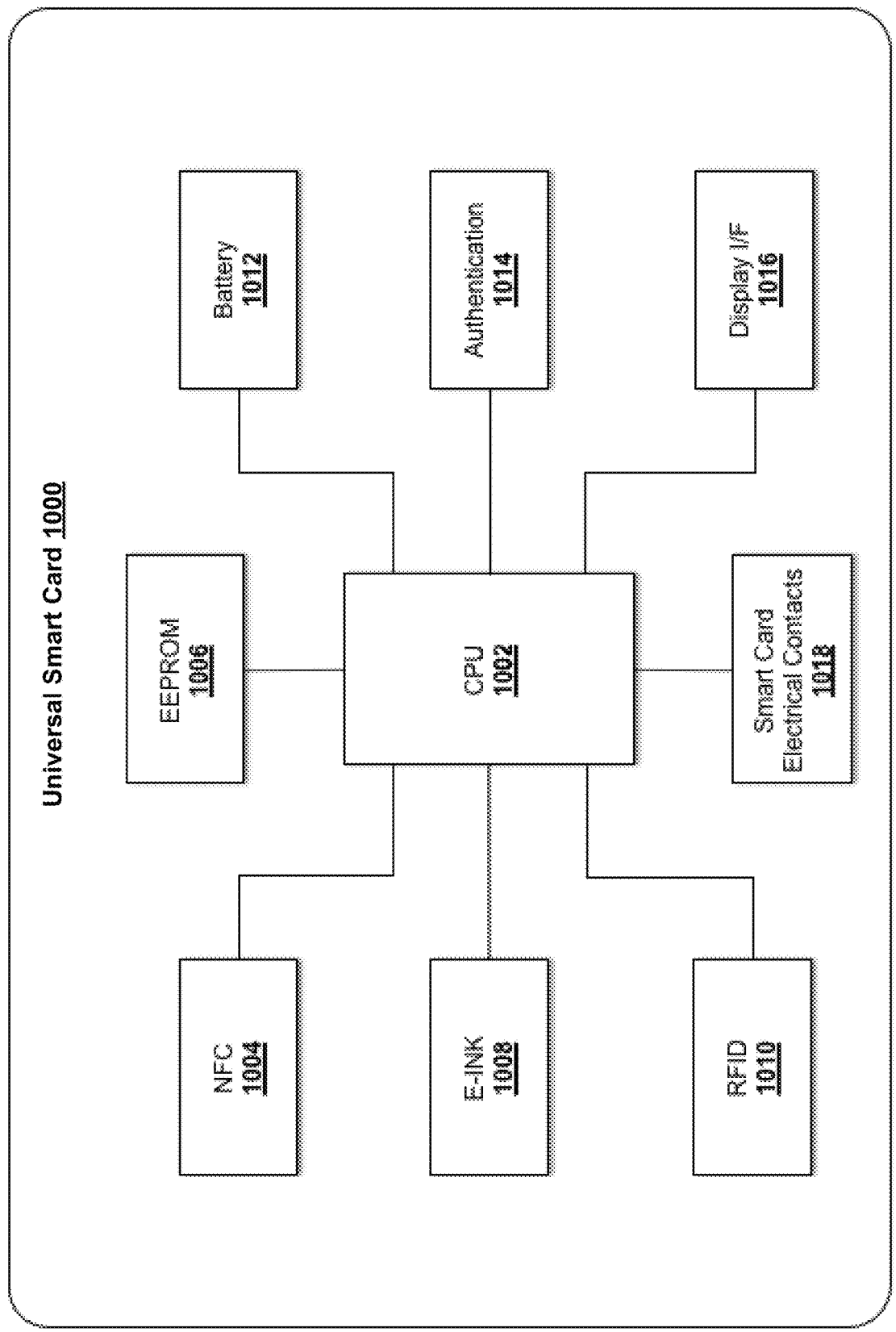
FIG. 10 illustrates, in a schematic diagram, an example of a universal smart card, in accordance with some embodiments.

FIG. 10 illustrates, in a schematic diagram, an example of a universal smart card (USC) 1000, in accordance with some embodiments. The universal smart card 1000 comprises a plastic card having the following components: a Microprocessor/CPU 1002, a Near Field Communication 1004 chip, an EEPROM 1006, an E-Ink 1008 chip, an RFID 1010 chip, a battery 1012, an authentication 1014 chip, a display interface 1016, and electrical contacts 1018 to charge the universal smart card 1000. In some embodiments, the universal smart card 1000 may be charged via the smart card sleeve 1100.

Figure 11:
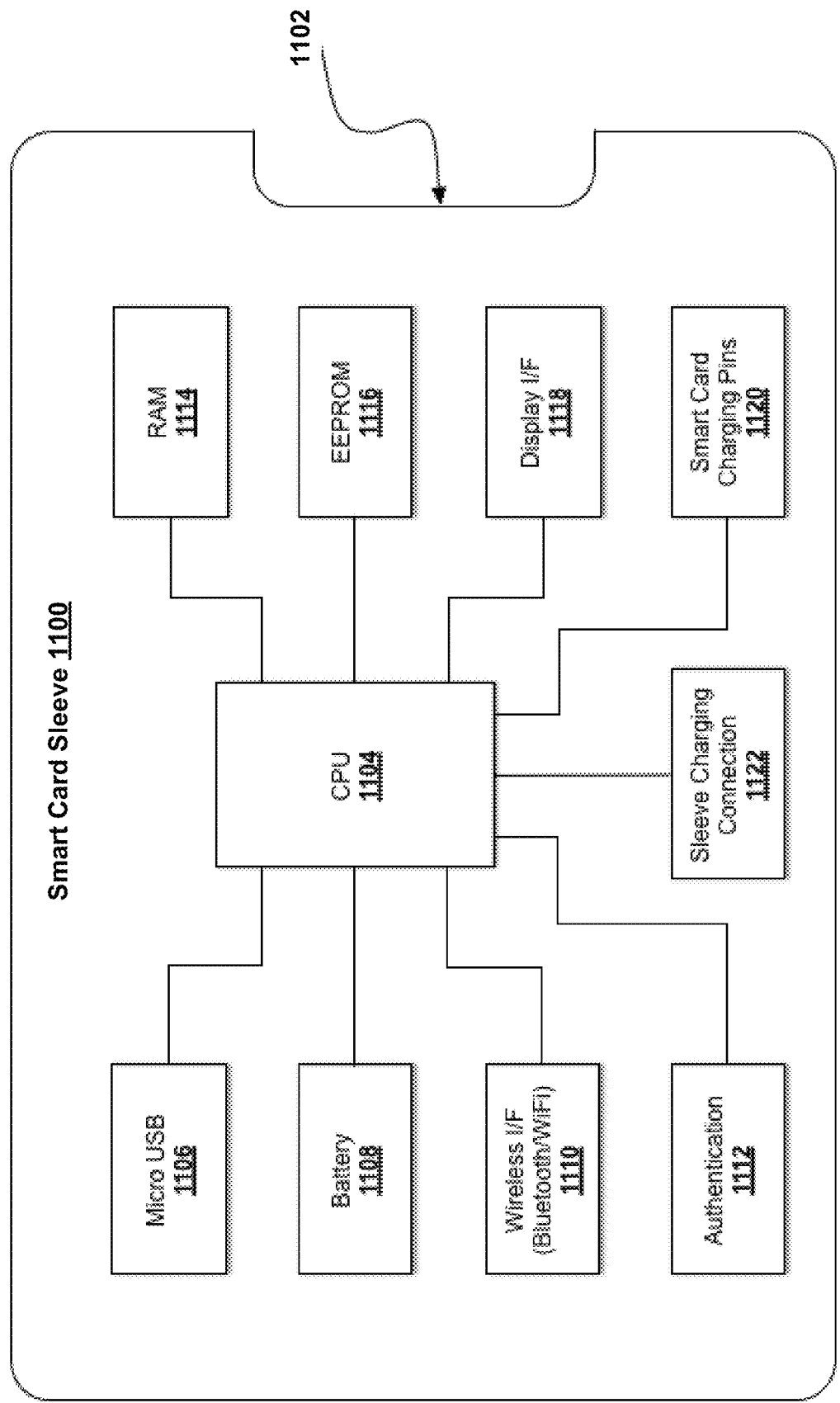
FIG. 11 illustrates, in a schematic diagram, an example of a smart card sleeve, in accordance with some embodiments.

FIG. 11 illustrates, in a schematic diagram, an example of a smart card sleeve 1100, in accordance with some embodiments. The smart card sleeve 1100 is an example of a smart wallet. The term "sleeve" will be used herein to reference a smart wallet. The "sleeve" is an example of a form factor for a smart wallet. The smart card sleeve 1100 may comprise any container form factor that may hold and read a smart card. The smart card sleeve 1100 shown is a jacket sized to hold the entire smart card, for simplicity of presentation. The smart card sleeve 1100 comprises a jacket/pocket 1102 to insert a smart card 1000 and includes the following components: a Microprocessor/CPU 1104, a micro USB port 1106 to charge the sleeve without a receptacle (see FIG. 12), a battery 1108, a wireless interface 1110, an authentication 1112 chip, RAM 1114 chip, an EEPROM 1116 chip, a capacitive display interface 1118, universal smart card charging pins 1120, and a charging connection 1122 for the sleeve when it is put on the receptacle (see FIG. 12). The capacitive display 1118 allows a user to input data into the sleeve 1100 and view the results of processing. The sleeve 1100 may also store a universal smart card (USC) and: (a) display a credit window of each of the cards stored in the USC, (b) display redemption points or cash back on any of the plurality of cards stored in the USC, (c) program the USC to use the card with the maximum credit window by default, (d) program the USC to split the payment among the different cards stored in its EEPROM, (e) display the purchase transactions of any of the cards stored in the USC, and (f) allow the card user to capture and read reviews of purchase transactions directly. The sleeve 1100 provides an alternate tool for making electronic payments and checking transaction history. In some embodiments, the features in the sleeve 1100 could also be made available in a smart phone with wireless payment capabilities through Near Field Communication (NFC) or similar technologies. The disclosure describes scenarios where a user can choose to view the transaction history via a sleeve 1100 or a mobile phone 800. The sleeve 1100 may be preferred by users who do not want all their information or cards on a phone.

In some embodiments, a smart card sleeve may be limited to the jacket/pocket 1102 to hold the universal smart card 1000, the Microprocessor/CPU 1104 to execute instructions stored in the memory 1116, a communication interface (such as the wireless interface 1110) for communicating with the platform 200, and the EEPROM 1116 chip for storing transaction details, and instructions for the operation of the universal smart card 1000. Other element from the smart card sleeve 1100 may be added to this alternative embodiment.

In some embodiments, there is provided a smart card sleeve (e.g., smart wallet). The smart card sleeve comprises a jacket of sufficient size to fit at least one smart card, a communication interface, a processor, and a memory comprising a sequence of instructions which when executed configure the processor to receive from a smart card inserted in the jacket the purchase details of recent purchases made using the smart card, receive from a server the purchase reviews of the purchases made, and store the purchase details and purchase reviews in the memory.

In an aspect, the smart card sleeve processor is further configured to transmit to the server the purchase details, and transmit to the server, the purchase reviews.

In an aspect, the smart card sleeve further comprises a display. The processor is further configured to display the purchase details and purchase reviews.

Figure 12:
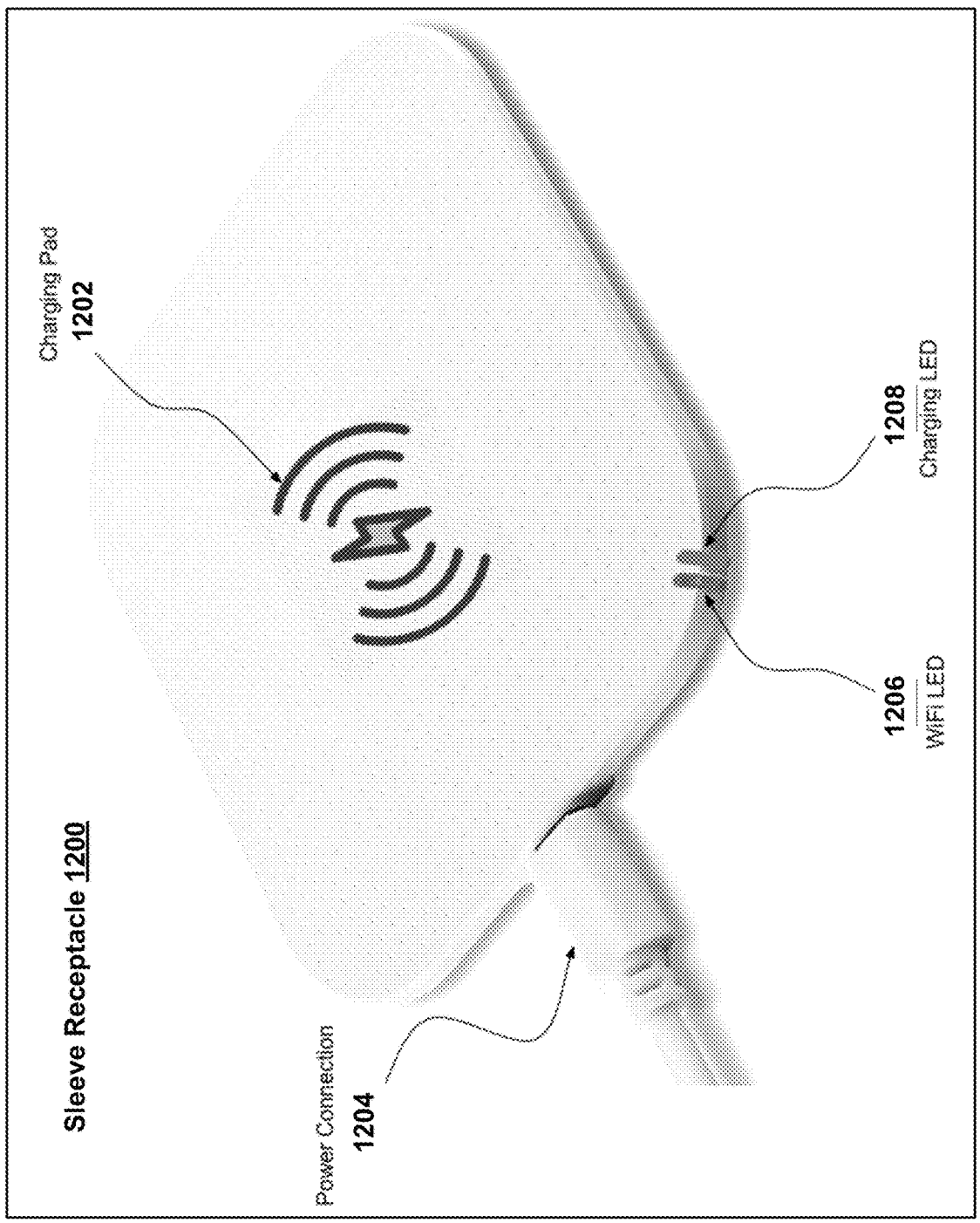
FIG. 12 illustrates, in an image, an example of a sleeve receptacle, in accordance with some embodiments.

FIG. 12 illustrates, in an image, an example of a sleeve receptacle 1200, in accordance with some embodiments. The sleeve receptacle 1200 comprises a WiFi interface embedded in its charging pad 1202, a power connection 1204, a WiFi LED 1206 and a charging LED 1208. When the sleeve 1100 is put on the receptacle 1200, it may charge the battery of the sleeve 1100, and may also synchronize the universal smart card 1000 with the latest information from the issuer. In some embodiments, the sleeve 1100 is programmed to run a synchronization (sync) operation with trusted devices (mobile devices/computer) within a geographical boundary only (house/office) in order to prevent hackers from eavesdropping into any communication between the sleeve 1100 and an Internet device (e.g., mobile phone 800).

Thus, a mechanism to store multiple cards into the universal smart card 1000 via the sleeve 1100 is provided. To store multiple cards, the user may first insert each card that needs to be stored onto the universal smart card 1000 into the sleeve 1100 and then remove it. This process (i.e., Registration) may import the information of all the cards into the sleeve 1100 and allow it 1100 to program the universal smart card 1000 with multiple card information (i.e., Initialization). Another way to achieve the same result would be to store the information of all the cards into the user's online account, and then import the details into the universal smart card 1000 via the sleeve 1100. It is understood that the sleeve 1100 may be configured to add new cards or update current cards in a similar manner as the Registration and Initialization. For example, a user may insert and remove a new card and the sleeve 1100 may initialize the new card within the universal smart card 1000.

FIGS. 13, 14, 15, and 16 demonstrate a use case wherein an intelligent sleeve 1100 can be used to unobtrusively capture the purchase details of card transactions.

Figure 13:
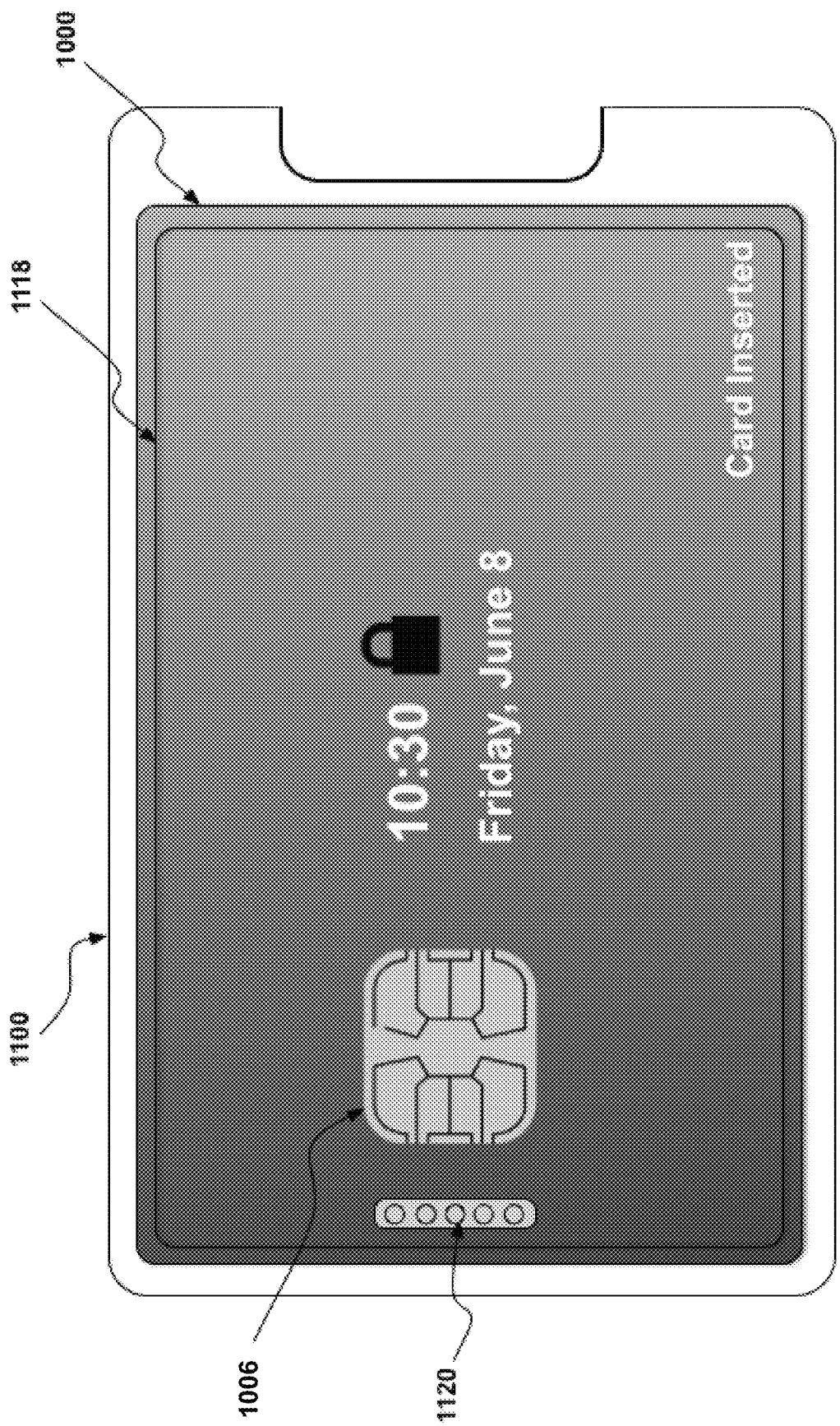
FIG. 13 illustrates an example of a universal smart card in a sleeve, in accordance with some embodiments.

FIG. 13 illustrates an example of a universal smart card 1000 in a sleeve 1100, in accordance with some embodiments. The universal smart card 1000 is capable of storing the details of multiple cards (debit, credit, loyalty etc.) inserted into the sleeve 1100 wherein the card details are protected via a passcode. The display unit 1118 shows the date and time and the card status (locked). The sleeve 1100 can be used with a standard smart card 1000 encoded with a single card number also, although the smart card 1000 should also have the capability of capturing purchase details into its EEPROM 1006.

Figure 14:
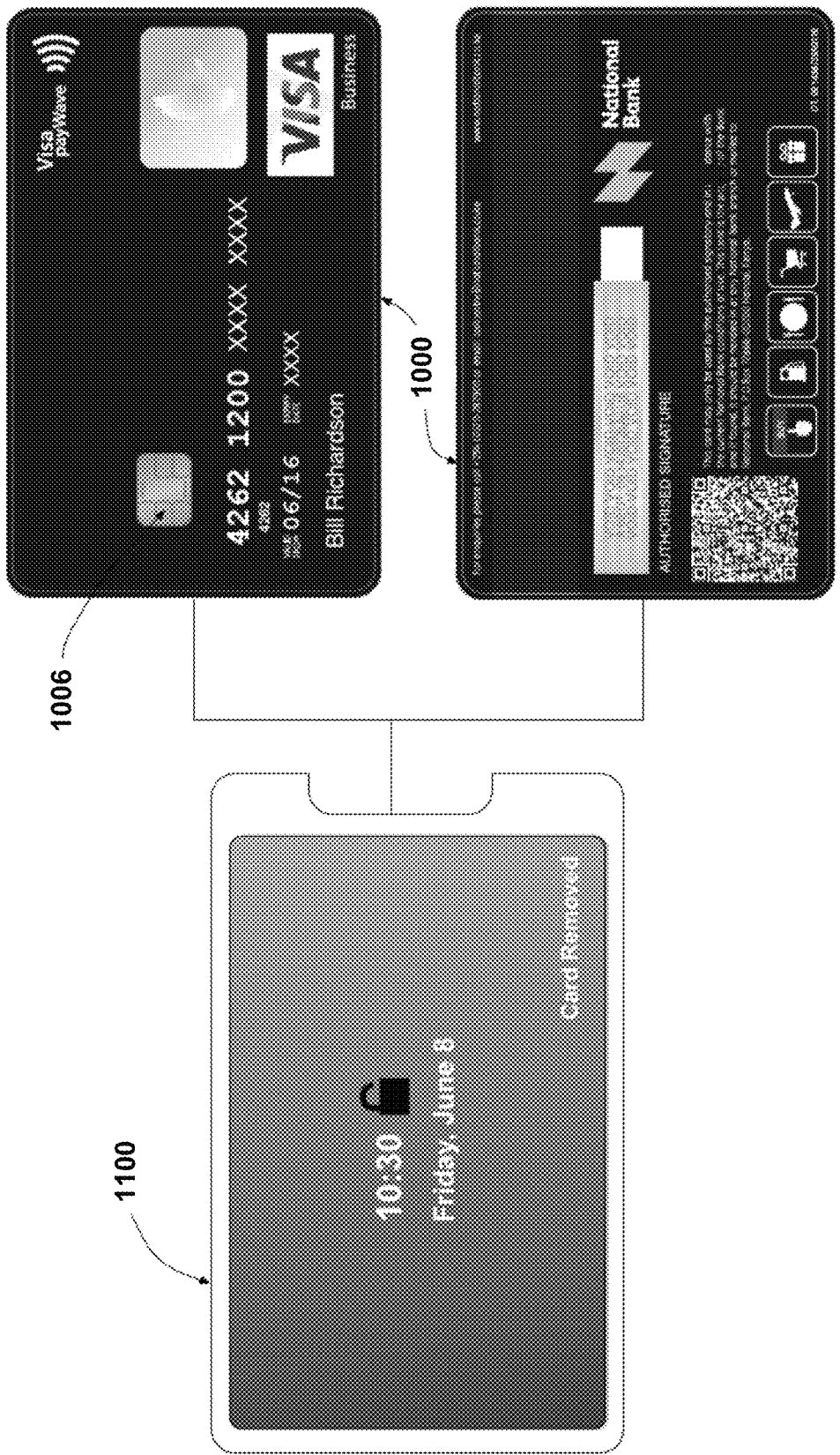
FIG. 14 illustrates an example of the sleeve without the universal smart card, in accordance with some embodiments.

FIG. 14 illustrates an example of the sleeve 1100 without the universal smart card 1100, in accordance with some embodiments. In some embodiments, when the universal smart card 1000 is removed from the sleeve 1100, the card number, expiry, and CVV number are masked. This is intended to prevent a person other than the card owner from copying the card details. In some embodiments, the sleeve 1100 programs the universal smart card 1000 to use the credit card with the maximum credit window/repayment period by default.

Retail stores may give loyalty cards to their customers to allow them to earn points every time they make a purchase. A loyalty card can be a plastic card without any credit on it or a plastic card that contains some credit provided by the merchant. A side effect of carrying multiple loyalty cards is that although consumers are able to redeem points at the POS every time they make a purchase, each loyalty card adds to the bulk of the wallet/purse, making them unwieldy and prone to theft. The universal smart card 1100 may eliminate the need to carry multiple cards.

The universal smart card 1000 has an EEPROM 1006 that can store the vendor identifier (id) into its memory. A user can add a vendor into the universal smart card 1000 by inserting the existing loyalty card into the sleeve 1100 (which reads the loyalty card information) and subsequently inserting the universal smart card 1000 into the sleeve 1100 (which will import the loyalty card information into the EEPROM 1006 of the universal smart card). An alternative way of registering loyalty card information into the universal smart card 1000 is when a customer enters the POS of the merchant and attempts to make a purchase by inserting the universal smart card 1000 into a card reader. The card reader interrogates the EEPROM 1006 of the universal smart card 1000 to read the vendor id. If it finds none, the POS representative may ask the customer if it wants to register for a loyalty card. The customer can decline the offer or accept the offer. In some embodiments, if the customer declines the offer, the merchant records the denial into the EEPROM 1006 and the customer is not asked the same question again. If the customer accepts the offer, the merchant records an acceptance in the EEPROM 1006 and requests the customer to fill a paper or electronic form for further processing. When the customer's request is processed, the loyalty card information is saved in the EEPROM 1006. The merchant is then able to add and delete points from the users loyalty card account as necessary.

Figure 15:
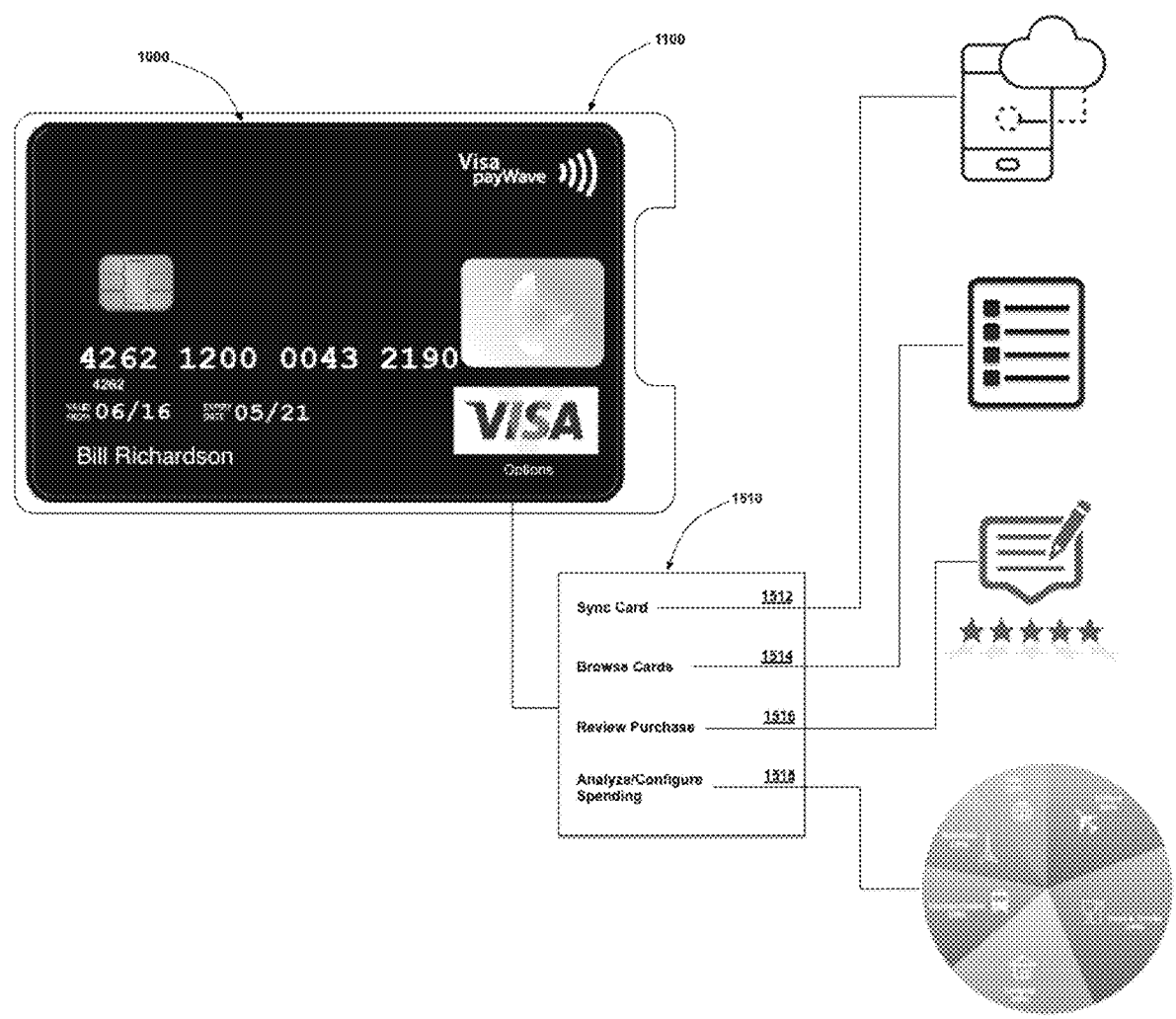
FIG. 15 illustrates an example of a universal smart card inserted into the sleeve and unlocked, in accordance with some embodiments.

FIG. 15 illustrates an example of a universal smart card 1000 inserted into the sleeve 1100 and unlocked, in accordance with some embodiments. In some embodiments, the sleeve 1100 shows the full card details and shows a menu 1510 to synchronize 1512 the card with the issuer/bank so that current balance can be viewed. The menu 1510 may also allow the user to browse 1514 all the cards stored in the universal smart card 1000, capture 1516 a review/experience with any purchase, and also analyze/configure 1518 its spending on any or all of the cards. In some embodiments, the sleeve 1100 could be programmed to assist smart card users to set purchase limits and alerts on cards per spend category (e.g., travel, food, vehicle, entertainment).

Figure 16A:
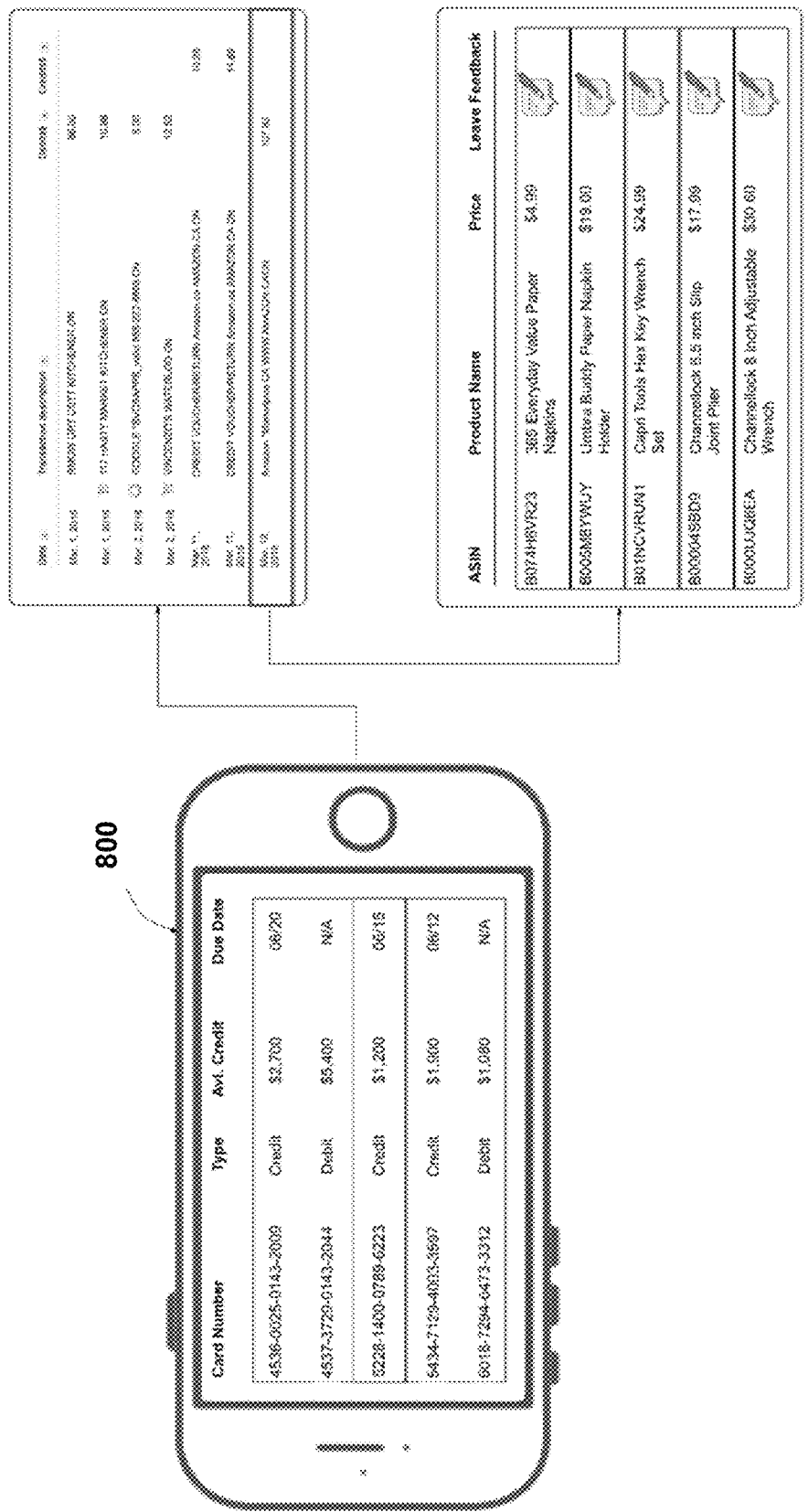
FIGS. 16A and 16B illustrate an example of checking the purchase history of one of the cards stored in the universal smart card, in accordance with some embodiment.
Figure 16B:
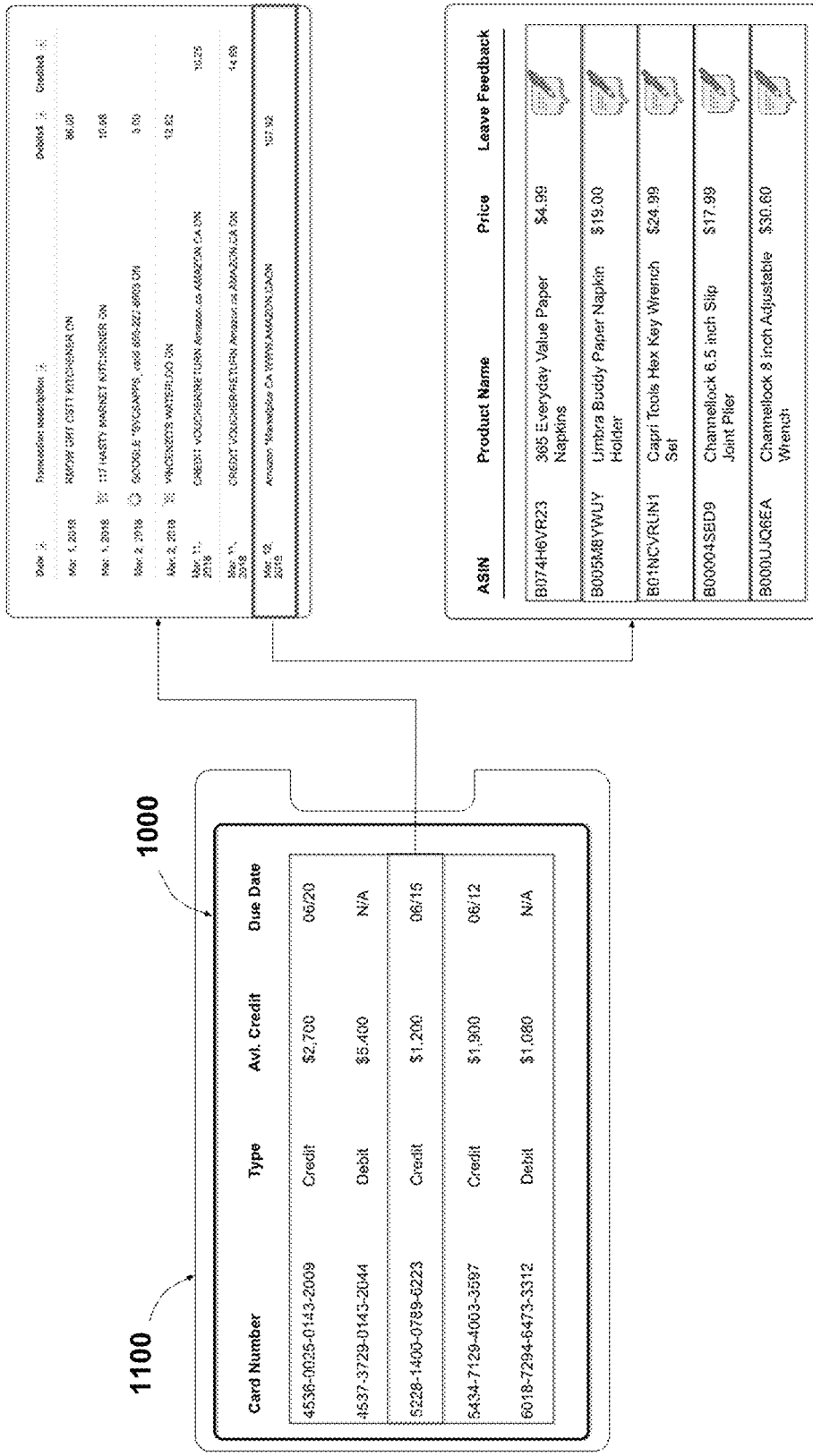

FIGS. 16A and 16B illustrate an example of a user checking the purchase history of one of the cards stored in the universal smart card 1000, in accordance with some embodiment. FIG. 16A shows the information displayed on a smart phone 800. FIG. 16B shows the information displayed on a sleeve 1100. In this example, the user has selected card number 5228-1400-0789-6223 that has a credit balance of $1,200 and a payment due date of June 15. The user looks at the transactions of this card and selects a transaction initiated with Amazon on March 12. Per the transaction history, the user spent $107.92 to purchase five products. The user can submit a review of any or all of the products via the intelligent sleeve 1100 (see FIG. 16B) itself or through a computer or a mobile device 800 (see FIG. 16A) that can access the transaction details of the card 1000.

The transaction details captured on the universal smart card 1000 will assist users in capturing their reviews/experiences with a product/business/service. The proposed solution provides a way to lookup the information mapped to UPC, EAN, ASIN, or ISBN numbers and dynamically generate a contextually relevant form to capture the review/experience associated with the transaction. The captured review/experience can be shared with the user's social network and anonymously submitted to the search index providing authenticated information about a product/business/service provider. Other alternate ways to capture the UPC, EAN, ASIN, or ISBN numbers including the transaction details is by scanning a Quick Response (QR) code containing the details on the printout of the purchase statement, receiving an email/URL containing the transaction details or electronically recording the transaction into the cardholder's account in an online database, at the time of making the payment. Since all payment cards have a unique id, the transaction invoice containing the card id (Foreign Key) can be linked to the cardholder's id (Primary Key) in the transactions database 141.

In an aspect, the smart card sleeve further comprises a first and a second communication interface. The processor 1104 is configured to communicate with the smart card 1000 via the first communication interface, and communicate with the server via the second communication interface. In an aspect, the second communication interface is a wireless communication interface, and the processor is further configured to only communicate with the server within a predefined distance from a trusted device 10, 800 in communication with the platform 200 server. In an aspect, the second communication interface is a wireless communication interface, and the processor is further configured to only communicate with the trusted device and at a trusted location.

In an aspect, the sleeve 1100 houses a smart card 1000 comprising a plurality of cards, and the processor is further configured to track spending usage of each of the plurality of cards stored in the smart card 1000.

In an aspect the smart card sleeve processor 1104 is further configured to maintain a balance for each of the plurality of cards, display a credit window for each of the plurality of cards, split the payment among the different cards stored in its EEPROM 1116, and display redemption points or cash back on any of the plurality of cards. In an aspect, the smart card sleeve processor 1104 is further configured to maintain a balance for each of the plurality of cards 1100, and display a recommendation to use one of the cards having a maximum credit window.

Figure 17:
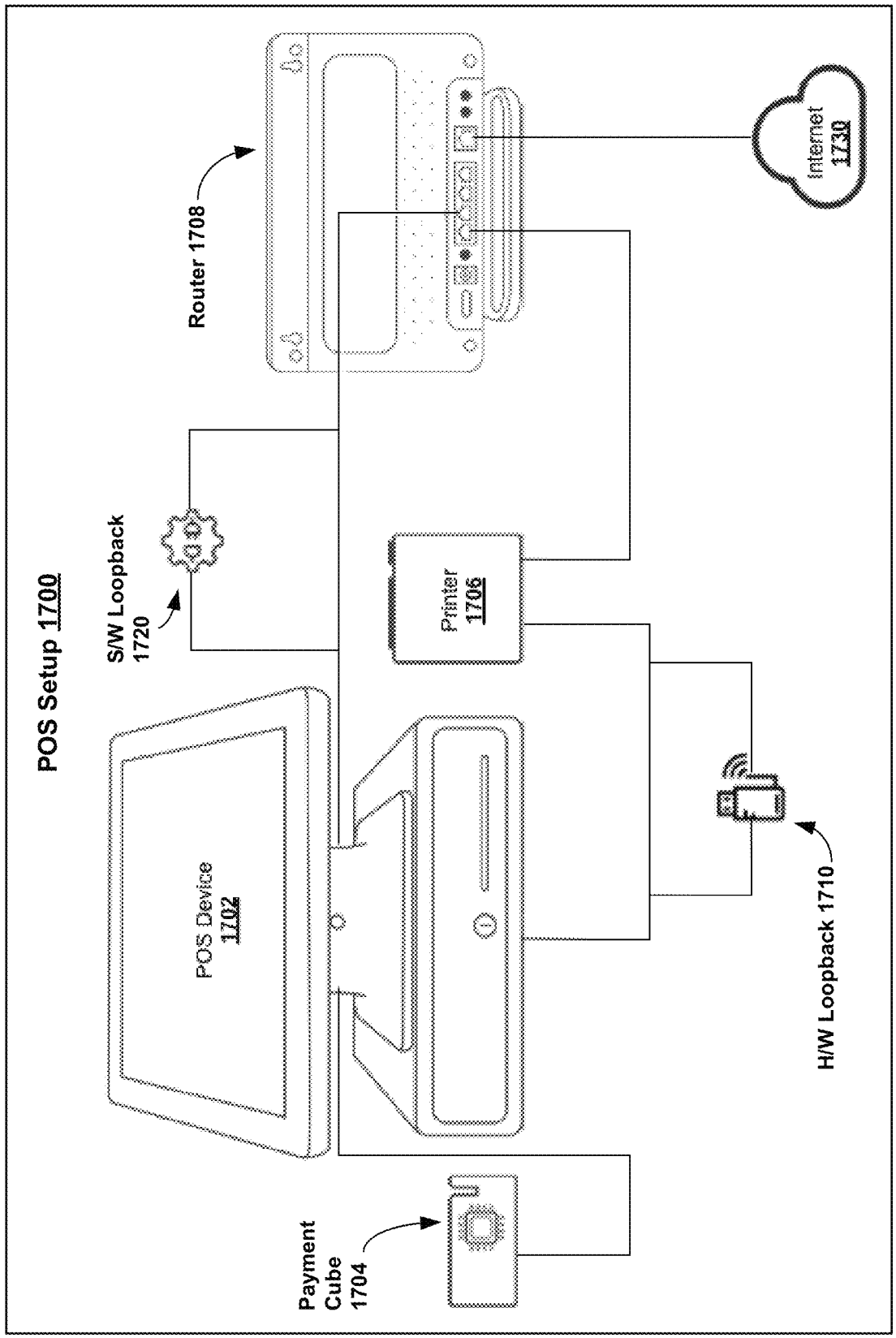
FIG. 17 illustrates an example of a POS setup, in accordance with some embodiments.

FIG. 17 illustrates an example of a POS setup 1700, in accordance with some embodiments. The POS setup 1700 comprises a POS device 1702, a payment cube/card reader 1704, a printer 1706, and a router 1708. The system 1700 will allow a transaction record to be captured via a modified payment cube 1704, an Internet-enabled dongle (H/W Loopback 1710) installed at the printer 1706 or a software driver (S/W Loopback 1720) installed on the POS device 1702.

Figure 18:
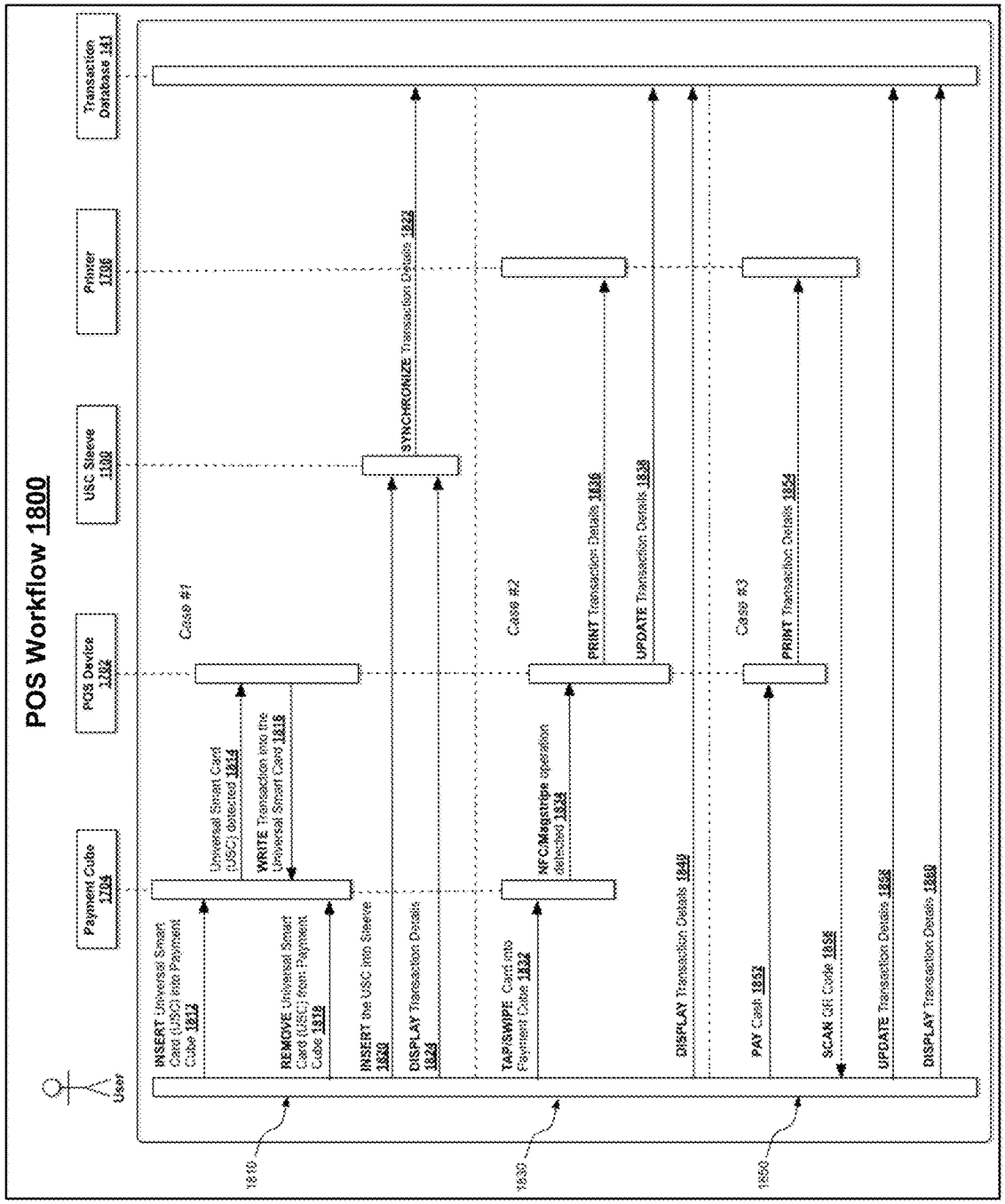
FIG. 18 illustrates, in a sequence diagram, an example of a POS workflow, in accordance with some embodiments.

FIG. 18 illustrates, in a sequence diagram, an example of a POS workflow 1800, in accordance with some embodiments. The workflow 1800 includes three use cases: (a) an example of a user making a payment by inserting a card into the payment cube 1810; (b) an example of a user making a payment by tapping/swiping the card or tapping the phone 1830; and (c) an example of a user making a payment in cash 1850, in accordance with some embodiments. The method 1800 begins with the user initiating a payment at the point of sale (POS).

In the first use case 1810, the user inserts 1812 the universal smart card 1000 into the payment cube 1704 (connected to POS device 1702). The payment cube 1704 detects that it is a universal smart card 1000 and sends a message 1814 to notify the POS device 1702. The POS device 1702 sends a message 1816 to trigger the payment cube 1704 to record the transaction details directly into the EEPROM 1006 of the universal smart card 1000. Next the user removes 1818 the universal smart card 1000 from the payment cube 1704. In some embodiments, if the payment cube 1704 detects that the inserted card is not a universal smart card 1000, the POS device 1702 may send a message 1836 to the printer 1706 to print the transaction details, and send a message 1838 to the transaction database 141 to update the transaction record in the card user's online account as in the second use case 1830. Once the transaction details are recorded into the universal smart card 1000, the user inserts 1820 the universal smart card 1000 into the sleeve 1100. If the sleeve 1100 is connected to the Internet, it sends a message 1822 to the transaction database 141 to synchronize the universal smart card 1000 with the user's online account, and the sleeve 1100 displays 1824 the updated transaction details to the user. Transaction details are uploaded and downloaded as required.

In the second use case 1830, the user taps or swipes 1832 the payment card into the payment cube 1704. The payment card can be a universal smart card 1000 or any ordinary payment card containing an NFC chip and Magnetic stripe. The payment cube 1704 detects that it is a NFC/Magstripe operation and sends a message 1834 to notify the POS device 1702. Next, the POS device 1702 sends a message 1836 to the printer 1706 to print the transaction details, and sends a message 1838 to the transaction database 141 to update the transaction record in the card user's online account. Next, the user opens the mobile device/computer 800 and sends a message 1840 to the transaction database 141 to display the updated transaction details to the user.

In the third use case 1850, the user makes a cash payment 1852 to the POS representative. The representative accepts the payment and triggers the POS device 1702 to send a command to the printer to print 1854 a transaction invoice containing a Quick Response (QR) code associated with the transaction details. The user may then scan 1856 the QR code via its mobile device 800 and update 1858 the transaction record in the card user's online account (i.e., in the transactions database 141). Next, the user opens the mobile device/computer 800 and sends a message 1860 to the transaction database 141 to display the updated transaction details to the user.

The POS 1700 provides multiple options for capturing the full details of a card transaction. Some customers elect to tap (using NFC) or swipe (using Magnetic Stripe) their card at the POS, which may not give enough time to record the transaction details on their card. In such cases, the merchant can send an electronic copy of the transaction to the customer's email id or record the data into a central location from where the customer can access full information on the card transaction.

Figure 19:
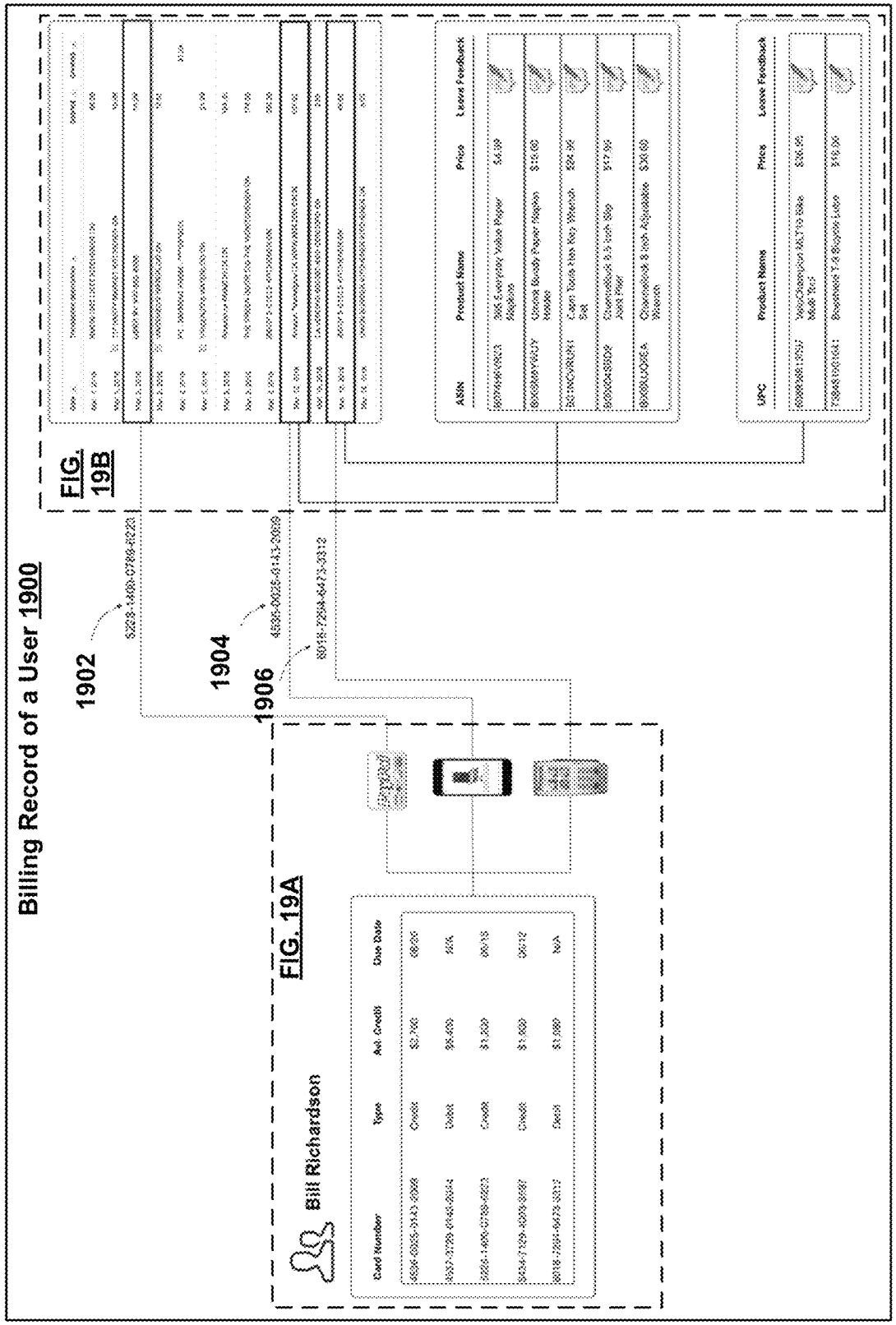
Figure 19B:
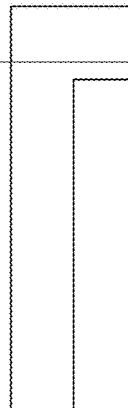

FIGS. 19, 19A and 19B illustrate an example of a billing record 1900, in accordance with some embodiments. FIG. 19 shows the billing record 1900 of a person (e.g., Bill Richardson) who used different payment channels (online payment, smartphone, and credit card) to pay for his transactions. FIG. 19A shows an enlarged view of the display. The billing record 1900 shown in this example can be on the smart phone 800 or sleeve 1100. In this example, Bill can check the transaction details of any of the bills paid by him by selecting the corresponding record. FIG. 19B shows an enlarged view of three examples of transaction details. In the first example 1902, an example of transactions for an online payment system account is shown. In the second example 1904, an example of transactions for an ASIN account is shown. In the third example 1906, an example of transactions for a UPC account is shown.

Figure 20:
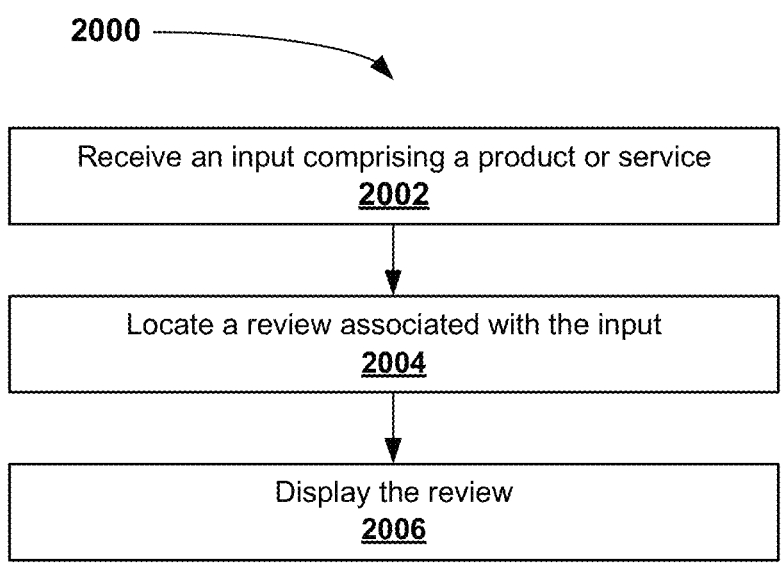
FIG. 20 illustrates, in a flowchart, an example of a method of obtaining a review, in accordance with some embodiments.

FIG. 20 illustrates, in a flowchart, an example of a method 2000 of obtaining a review, in accordance with some embodiments. The method 2000 comprises receiving 2002 an input comprising a product or service, locating 2004 a review associated with the input, and displaying 2006 the review. Other steps may be added to the method 2000. In an aspect, the smart card sleeve processor 1104 is configured to receive an input comprising a product or service, locate a review associated with the input, and display the review.

Social Networking

Some social networking websites allow people to publish their profiles, receive and provide endorsements for professional skills, and also receive and give professional recommendations. While this methodology is good in intent, some people may try to game the system and promote themselves/others fraudulently. Many social networking websites do not have a mechanism of checking the credibility of the person giving the endorsement and also verifying the credentials of the person who has created a profile in their platform. The burden of establishing the proof may be placed on the reader. The system 100 may mitigate or attempt to remove the ambiguity in online content.

Prior to the current teachings, a customer can submit reviews of a product/business/service provider and share the review with its social network and the rest of the world if the product/business/service provider solicits a review from the customer. Additionally, the submitted reviews are locked into the product/business/service provider's database and not visible to the rest of the world. In contrast, the current teachings break away from this limitation by allowing customers to capture reviews of product/business/service provider by performing a phonebook lookup or by associating the review with a business transaction. When the customer captures information in this manner, the reviews are associated with the product/business/service provider and the customer.

The reviews database 142 that is built and maintained may be considered to be a single point of truth (SPOT) that comprises credible information about products, businesses, service providers or any other data critical in decision making. This objective is realized by allowing ordinary people and subject matter experts to rank and rate their experience with any of the aforementioned entities without any fear of retribution, as ordained in consumer protection legislation, such as the United States Consumer Review Fairness Act of 2016 (HR-5111) for example. The system 100 provides one technique of accomplishing this mission—capturing all electronic (online) transactions and card payments into a database that is accessible to users via their individual accounts and allowing users to rank and rate their experience with any product/business/service (see FIG. 5—use case 510). In addition, the system 100 also provides a technique of capturing solicited and unsolicited reviews via a phonebook repository (see FIG. 4 and FIG. 5—use case 520). The system 100 is not limited in scope to the aforementioned data sources only as it is clear that it can be extended to other data sources 110 as well. For example, the techniques described in the embodiment could also be used to validate and endorse/reject news in the online world. The menace of fake news has taken root in the online world, in part, because there is no universally recognized organization that has the responsibility or trust of certifying a news story. Once a mechanism is put up to connect a story with the provider and validate the credentials of the provider, the problem of fake news may be mitigated.

The transaction details and reviews captured in a centralized repository can assist consumers in many ways. Consumers may be able to visibly share their experiences with products, businesses, and service providers with their social network and anonymously with the rest of the world. FIGS. 21A to 21C illustrate an example of sharing consumer experiences, in accordance with some embodiments. FIGS. 21A to 21C show three use cases: a) Business as Usual 2110, b) SPOT—Consolidated Reviews per Person 2120, and c) Shared—Reviews Shared among a Group 2130. The first use case 2110 is the present scenario wherein reviews are locked into each vendor's database and not accessible to the outside world. The second use case 2120 illustrates a scenario wherein user reviews are captured at a central location in their respective accounts. These reviews can be accessed via a mobile device (phone, sleeve) or a computer. The third use case 2130 illustrates a scenario wherein a group of friends have consented to share their reviews with each other. Thus, when any one of them accesses the system 100 reviews database 142, they are able to see all the reviews captured by the group.

A consolidated database of reviews may assist consumers as well as vendors in decision making. For instance, a current customer may be able to infer, for example, that a previous customer regularly purchases computer hardware; the current customer should speak with the previous customer before buying computer hardware and/or check their reviews; the system 100 consolidates the previous customer's reviews across retailers; the current customer can learn from the previous customer's experience. The current customer may also be able to infer that, for example, that the previous customer gave a negative review of a business' extender device; the current customer should consider purchasing a better router to improve the network connectivity at their house; the current customer was just about to purchase the business' extender after looking at its raving reviews on an electronic commerce website; thanks to the system 100, the current customer can see that the product has engineering defects. A vendor may be able to infer, for example, that a customer has done a very thorough review of a branded USB cable and a branded MP3 player. The customer's profile suggests that the customer is an experienced electronics engineer. Looking at the average rating that these products received from other customers also, the product should be delisted from the vendor's catalog, and return the unsold stock to the manufacturer.

Figure 22A:
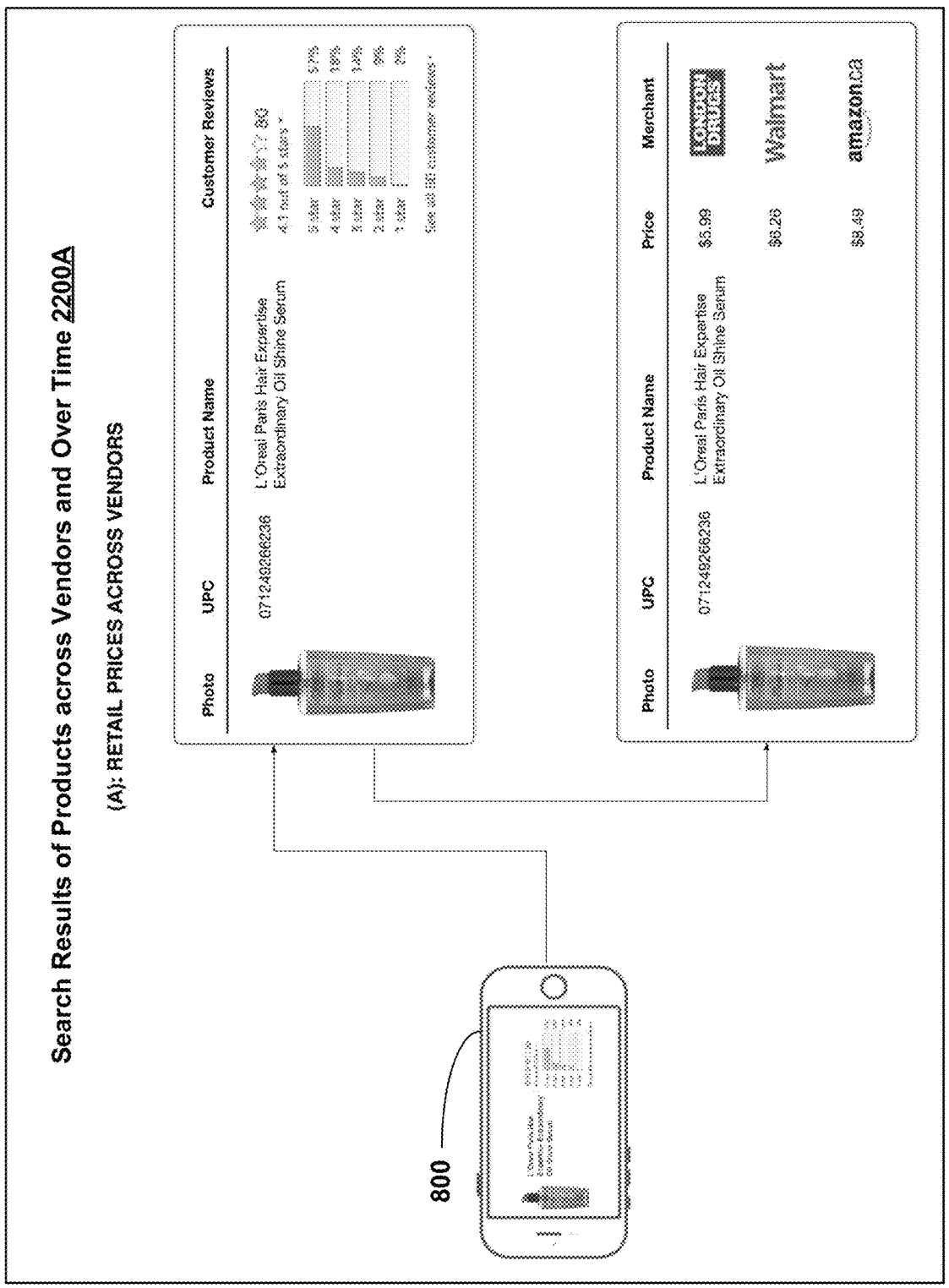

The system 100 search engine 132 may also assist consumers in determining the real value of products and services. For example, some retailers may entice customers to purchase products by raising the prices of products and then offering a discount on the inflated price. This practice nullifies any discount as the customer ends up paying the actual retail price of the product. In some embodiments, the system 100 may maintain an archive of prices across stores and geographic locations, thereby allowing customers to compare prices across retailers before making a purchase (see FIG. 22A). The system 100 may also allow them to verify the historical price of a product before making a purchase (see FIG. 22B). FIGS. 22A and 22B illustrate examples of search results of products across vendors and over time, in accordance with some embodiments.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for acquiring and verifying information, the system comprising:
   a server processor;
   a server memory comprising a sequence of instructions which when executed by the server processor configure the server processor to:
   receive, from a smart card wallet associated with a reviewer, a transaction invoice;
   store, in a data store, the transaction invoice;
   obtain, from the data store, at least one attribute associated with the transaction invoice;
   obtain, from the data store, at least one keyword associated with the at least one attribute;
   obtain, from a machine learning library, at least one contextual review form parameter associated with the at least one keyword, the at least one contextual review form parameter logically associated with a type of product or service listed in the transaction invoice, wherein the machine learning library is configured to:
   maintain a corpus of information it discovers from at least one of:
   contextual review form parameters used in past received reviews, or contextual review form parameters defined or selected by users when customizing review forms;
   detect changes made by reviewers to past contextual review form parameters for a product or a service listed in the transaction invoice; and
   update, responsive to the changes, a lookup table of keywords and associated contextual review form parameters;
   generate a contextual review form comprising the at least one parameter logically associated with the type of product or service listed in the transaction invoice;

send, to the smart card wallet, the contextual review form;
receive, from the smart card wallet, the contextual review form with review details data;
normalize the review details data, wherein the server processor is configured to:
parse the review details data for meaningful information;
extract metadata from the review details data; and
map the parsed information to internal data structures;
determine an identity of the reviewer;
classify the normalized data based on the identity of the reviewer and the extracted metadata; and
store the classified normalized data, wherein the corpus of information maintained by the machine learning library is updated responsive to the storing of the classified normalized data; and
the smart card wallet comprising:
a jacket of sufficient size to fit at least one smart card;
at least one communication interface for communicating with the at least one smart card, and for communicating with the server;
a display;
a smart card wallet processor; and
a smart card wallet memory comprising a sequence of instructions which when executed by the smart card wallet processor configure the smart card wallet processor to:
store the transaction invoice;
send, to the server processor, the request for the contextual review form;
receive, from the server processor, the contextual review form; and
send, to the server processor, the contextual review form with the review details data.

2. The system as claimed in claim 1, wherein the server processor is configured to:
receive a request for the normalized data;
display the normalized data; and
display an overall score associated with the normalized data.

3. The system as claimed in claim 2, wherein:
the overall score comprises a combination of an average subject matter expert score and an average common person score; and
the server processor is configured to:
maintain a cumulative subject matter expert score used to determine the average subject matter expert score; and
maintain a cumulative average person score used to determine the average person score.

4. The system as claimed in claim 3, wherein to classify the normalized data, the server processor is configured to perform at least one of:
where the reviewer is a subject matter expert:
determine that the reviewer is the subject matter expert;
assign a subject matter expert score to the normalized data; and
store the subject matter expert score with the normalized data; or
where the reviewer is a common person:
determine that the reviewer is the common person;
assign a common person score to the normalized data; and
store the common person score with the normalized data.

5. The system as claimed in claim 1, wherein to classify the normalized data, the server processor is configured to:
determine one or more attributes associated with the normalized data;
assign an identifier to each of the one or more attributes associated with the normalized data; and
store the normalized data with the identifiers in the data store.

6. The system as claimed in claim 1, wherein the server processor is configured to:
send, to the smart card wallet, a validation message to confirm the identity of the reviewer;
receive, from the smart card wallet, a response message that confirms the identity of the reviewer; and
associate, based on the response message, the contextual review form with review details of the reviewer.

7. The system as claimed in claim 1, wherein the server processor is configured to:
receive an appraisal of a review from a third party device;
send, to the third party device, a validation message to confirm an identity of a third party associated with the third party device;
receive, from the third party device, a response message that confirms the identity of the third party; and
associate, based on the response message, the contextual review form with review details with the appraisal.

8. The system as claimed in claim 1, wherein the smart card wallet processor is configured to track spending usage of each of the at least one smart card stored in the smart card wallet, the smart card wallet processor configured to:
maintain a balance for each of the at least one smart card; and
display a recommendation to use the at least one smart card having a maximum credit window.

9. The system as claimed in claim 1, wherein the server processor is configured to:
calculate a rating score for the product or the service listed in the transaction invoice based on at least one of:
a list of parameters that have been evaluated in the past received reviews;
a number of positive rated parameters from common people;
a number of negative rated parameters from common people;
a number of positive rated parameters from subject matter experts; or
a number of negative rated parameters from subject matter experts.

10. The system as claimed in claim 1, wherein the server processor is configured to:
determine a score for a review, wherein the score is determined based on at least one of the following:
a number of parameters in the review that have been graded;
a negative rating that is reflected across different categories of a product or a service provided by a supplier;
a background of a reviewer of a review form;
a number of reviews submitted by the reviewer;
a number of reviews submitted by the reviewer that have been endorsed;
a number of reviews submitted by the reviewer that have been rejected; or
a number of false reviews previously submitted by the reviewer; and one of:
the background of the reviewer is a common person, and a rating of the review is raised by a first factor;

the background of the reviewer is an expert, and a rating of the review is raised by a second factor; or the background of the reviewer is a fake reviewer, and the review is discarded.

11. The system as claimed in claim 1, wherein the smart card wallet processor is configured to:
   receive, from a smart card inserted in the jacket, purchase details of recent purchases made using the smart card, wherein the smart card wallet houses the smart card, the smart card comprising a plurality of cards;
   receive, from the server processor, purchase reviews of the recent purchases made;
   store the purchase details and the purchase reviews in the server memory;
   display the purchase details and the purchase reviews; and
   track spending usage of each of the plurality of cards stored in a memory of the smart card, the smart card wallet processor configured to:
      maintain a balance for each of the plurality of cards;
      display a credit window for each of the plurality of cards;
      split a payment among the different cards stored in the memory of the smart card; and
      display redemption points or cash back on any of the plurality of cards stored in the memory of the smart card.

12. A computer-implemented method of acquiring and verifying information, the method comprising:
   storing, at a smart card memory of a smart card wallet associated with a reviewer, a transaction invoice;
   receiving, by a server processor from a smart card wallet processor of the smart card wallet, the transaction invoice;
   storing, in a data store, the transaction invoice;
   obtaining, by the server processor from the data store, at least one attribute associated with the transaction invoice;
   obtaining, by the server processor from the data store, at least one keyword associated with the at least one attribute;
   obtaining, by the server processor from a machine learning library, at least one contextual review form parameter associated with the at least one keyword, the at least one contextual review form parameter logically associated with a type of product or service listed in the transaction invoice, Wherein the machine learning library:
      maintains a corpus of information it discovers from at least one of:
         contextual review form parameters used in past received reviews, or
         contextual review form parameters defined or selected by users when customizing review forms;
      detects changes made by reviewers to past contextual review form parameters for a product or a service listed in the transaction invoice; and
      updates, responsive to the changes, a lookup table of keywords and associated contextual review form parameters;
   generating, by the server processor, a contextual review form comprising the at least one parameter logically associated with the type of product or service listed in the transaction invoice;
   sending, from the server processor to the smart card wallet processor, the contextual review form;
   receiving, by the server processor from the smart card wallet processor, the contextual review form with review details data;
   normalizing, by the server processor, the review details data, said normalizing comprising:
      parsing, by the server processor, the review details data for meaningful information;
      extracting, by the server processor, metadata from the review details data; and
      mapping, by the server processor, the parsed information to internal data structures;
   determining, by the server processor, an identity of the reviewer;
   classifying, by the server processor, the normalized data based on the identity of the reviewer and the extracted metadata; and
   storing, by the server processor in a memory, the classified normalized data, wherein the corpus of information maintained by the machine learning library is updated responsive to the storing of the classified normalized data.

13. The method as claimed in claim 12, comprising:
   receiving, by the server processor, a request for the normalized data;
   displaying, by the server processor on a display, the normalized data; and
   displaying, by the server processor on the display, an overall score associated with the normalized data.

14. The method as claimed in claim 13, wherein:
   the overall score comprises a combination of an average subject matter expert score and an average common person score; and
   comprising:
      maintaining, by the server processor, a cumulative subject matter expert score used to determine the average subject matter expert score; and
      maintaining, by the server processor, a cumulative average person score used to determine the average person score.

15. The method as claimed in claim 14, wherein classifying the normalized data comprises at least one of:
   where the reviewer is a subject matter expert:
      determining, by the server processor, that the reviewer is the subject matter expert;
      assigning, by the server processor, a subject matter expert score to the normalized data; and
      storing, by the server processor in a memory, the subject matter expert score with the normalized data; and
   where the reviewer is a common person:
      determining, by the server processor, that the reviewer is the common person;
      assigning, by the server processor, a common person score to the normalized data; and
      storing, by the server processor in the memory, the common person score with the normalized data.

16. The method as claimed in claim 12, wherein classifying the normalized data comprises:
   determining, by the server processor, one or more attributes associated with the normalized data;
   assigning, by the server processor, an identifier to each of the one or more attributes associated with the normalized data; and
   storing, by the server processor in a memory, the normalized data with its identifiers in the data store.

17. The method as claimed in claim 12, comprising:
sending, from the server processor to the smart card wallet processor, a validation message to confirm the identity of the reviewer;
receiving, by the server processor from the smart card wallet processor, a response message that confirms the identity of the reviewer; and
associating, by the server processor, based on the response message, the contextual review form with review details of the reviewer.

18. The method as claimed in claim 12, comprising:
receiving, by the server processor, an appraisal of a review from a third party;
sending, from the server processor to a customer device associated with the third party, a validation message to confirm an identity of the third party;
receiving, by the server processor from the customer device associated with the third party, a response message that confirms the identity of the third party; and
associating, by the server processor, based on the response message, the contextual review form with review details with the appraisal.

19. The method as claimed in claim 12, comprising:
tracking, by the smart card wallet processor, spending usage of each of at least one smart card stored in the smart card wallet, the tracking comprising:
    maintaining, by the smart card wallet processor in the smart card wallet memory, a balance for each of the at least one smart card; and
    displaying, by the smart card wallet processor on a smart card wallet display, a recommendation to use the at least one smart card having a maximum credit window.

20. The method as claimed in claim 12, comprising:
calculating, at the server processor, a rating score for the product or the service listed in the transaction invoice based on at least one of:
a list of parameters that have been evaluated in the past received reviews;
a number of positive rated parameters from common people;
a number of negative rated parameters from common people;
a number of positive rated parameters from subject matter experts; or
a number of negative rated parameters from subject matter experts.

21. The method as claimed in claim 12, comprising determining a score for a review, wherein the score is determined based on at least one of the following:
a number of parameters in the review that have been graded;
a negative rating that is reflected across different categories of a product or a service provided by the supplier;
a background of a reviewer of a review form;
a number of reviews submitted by the reviewer;
a number of reviews submitted by the reviewer that have been endorsed;
a number of reviews submitted by the reviewer that have been rejected; or
a number of false reviews previously submitted by the reviewer; and one of:
    the background of the reviewer is a common person, and a rating of the review is raised by a first factor;
    the background of the reviewer is an expert, and a rating of the review is raised by a second factor; or
    the background of the reviewer is a fake reviewer, and the review is discarded.

22. The method as claimed in claim 12, comprising:
obtaining, by the server processor, the type of product or service;
selecting, by the server processor, the parameters logically associated with the type of product or service; and
auto-populating, by the server processor, the contextual review form with the parameters logically associated with the type of product or service.

23. The method as claimed in claim 12, further comprising:
providing an option for the reviewer to change a parameter in the contextual review form.

24. A non-transitory computer-readable storage medium having instructions thereon which when executed by a processor perform a method of acquiring and verifying information, the method comprising:
storing, at a smart card memory of a smart card wallet associated with a reviewer, a transaction invoice;
receiving, by a server processor from a smart card wallet processor of the smart card wallet, the transaction invoice;
storing, in a data store, the transaction invoice;
obtaining, by the server processor from the data store, at least one attribute associated with the transaction invoice;
obtaining, by the server processor from the data store, at least one keyword associated with the at least one attribute;
obtaining, by the server processor from a machine learning library, at least one contextual review form parameter associated with the at least one keyword, the at least one contextual review form parameter logically associated with a type of product or service listed in the transaction invoice, wherein the machine learning library:
    maintains a corpus of information it discovers from at least one of:
        contextual review form parameters used in past received reviews, or
        contextual review form parameters defined or selected by users when customizing review forms;
    detects changes made by reviewers to past contextual review form parameters for a product or a service listed in the transaction invoice; and
    updates, responsive to the changes, a lookup table of keywords and associated contextual review form parameters;
generating, by the server processor, a contextual review form comprising the at least one parameter logically associated with the type of product or service listed in the transaction invoice;
sending, from the server processor to the smart card wallet processor, the contextual review form;
receiving, by the server processor from the smart card wallet processor, the contextual review form with review details data;
normalizing the review details data, said normalizing comprising:
    parsing the review details data for meaningful information;
    extracting metadata from the review details data; and
    mapping the parsed information to internal data structures;
determining, by the server processor, an identity of the reviewer of the data;

classifying, by the server processor, the normalized data based on the identity of the reviewer and the extracted metadata; and storing, by the server processor, the classified normalized data, wherein the corpus of information maintained by the machine learning library is updated responsive to the storing of the classified normalized data.

\* \* \* \* \*